US012686377B2

(12) United States Patent
Yamada et al.

(10) Patent No.: US 12,686,377 B2
(45) Date of Patent: Jul. 21, 2026

(54) VEHICLE CONTROL DEVICE, ANALYSIS DEVICE, AND ANALYSIS METHOD

(71) Applicant: AISIN CORPORATION, Kariya (JP)

(72) Inventors: Ichiji Yamada, Kariya (JP); Akira Kato, Kariya (JP)

(73) Assignee: AISIN CORPORATION, Kariya (JP)

( * ) Notice: Subject to any disclaimer, the term of this patent is extended or adjusted under 35 U.S.C. 154(b) by 197 days.

(21) Appl. No.: 18/416,140

(22) Filed: Jan. 18, 2024

(65) Prior Publication Data

US 2024/0262339 A1     Aug. 8, 2024

(30) Foreign Application Priority Data

Feb. 3, 2023     (JP) ................................. 2023-015143

(51) Int. Cl.
| | |
|---|---|
| B60W 10/22 | (2006.01) |
| B60W 30/02 | (2012.01) |
| B60W 40/06 | (2012.01) |
| B60W 40/08 | (2012.01) |
| G06N 7/01 | (2023.01) |
| G06V 20/56 | (2022.01) |
| G06V 20/59 | (2022.01) |

(52) U.S. Cl.
CPC .......... *B60W 10/22* (2013.01); *B60W 30/025* (2013.01); *B60W 40/06* (2013.01); *B60W 40/08* (2013.01); *G06N 7/01* (2023.01); *G06V 20/588* (2022.01); *G06V 20/597* (2022.01); *B60W 2420/403* (2013.01); *B60W 2520/18* (2013.01); *B60W 2710/226* (2013.01)

(58) Field of Classification Search
CPC .... B60W 10/22; B60W 30/025; B60W 40/06; B60W 40/08; B60W 2420/403; B60W 2520/18; B60W 2710/226; B60W 30/02; B60W 40/00; G06N 7/01; G06V 20/588; G06V 20/597; B60G 17/018
See application file for complete search history.

(56) References Cited

U.S. PATENT DOCUMENTS

| | | | | |
|---|---|---|---|---|
| 4,662,432 A | * | 5/1987 | Suzuki ................... | F16F 7/1028 |
| | | | | 165/41 |
| 4,700,971 A | * | 10/1987 | Doi ....................... | B60G 17/018 |
| | | | | 280/5.515 |
| 6,434,460 B1 | * | 8/2002 | Uchino ............. | B60G 17/01933 |
| | | | | 180/902 |
| 9,592,714 B2 | * | 3/2017 | Liu ....................... | B60G 17/016 |

(Continued)

FOREIGN PATENT DOCUMENTS

| | | |
|---|---|---|
| JP | 2013-147114 A | 8/2013 |

*Primary Examiner* — Lindsay M Low
*Assistant Examiner* — Brian R Kirby
(74) *Attorney, Agent, or Firm* — Sughrue Mion, PLLC

(57)     ABSTRACT

A vehicle control device includes: an acquisition unit configured to acquire a road surface condition in a traveling direction of a vehicle and occupant information on an occupant of the vehicle; an analysis unit configured to obtain an optimum vehicle characteristic based on the road surface condition and the occupant information such that a probability density distribution of changes in the road surface condition does not overlap a probability density distribution of changes in a vehicle characteristic; and a control unit configured to control the vehicle using the optimum vehicle characteristic obtained by the analysis unit.

12 Claims, 18 Drawing Sheets

(56)  References Cited

U.S. PATENT DOCUMENTS

| | | | |
|---|---|---|---|
| 2008/0183353 A1 * | 7/2008 | Post | B60G 17/0195 |
| | | | 701/84 |
| 2010/0025946 A1 * | 2/2010 | Inoue | B60G 15/08 |
| | | | 280/6.157 |
| 2013/0166149 A1 * | 6/2013 | Liu | B60G 17/015 |
| | | | 701/37 |
| 2013/0245889 A1 * | 9/2013 | Kikuchi | B60T 8/17555 |
| | | | 701/38 |
| 2016/0332625 A1 * | 11/2016 | Fukudome | B60W 30/18 |
| 2017/0136842 A1 * | 5/2017 | Anderson | B60N 2/501 |
| 2017/0334261 A1 * | 11/2017 | Tsumano | B60G 17/06 |
| 2020/0039316 A1 * | 2/2020 | Belter | B60G 17/0195 |
| 2021/0162832 A1 * | 6/2021 | Hwang | B60G 17/06 |
| 2021/0339596 A1 * | 11/2021 | Peters | B60G 17/018 |

* cited by examiner

| OCCUPANT INFORMATION | ROAD SURFACE CONDITION | OPTIMUM VEHICLE CHARACTERISTIC |
|---|---|---|

ROAD SURFACE 3: GRAVEL

ROAD SURFACE 2: STONE PAVED

ROAD SURFACE 1: ASPHALT

CURVE

STRAIGHT LINE

1
VEHICLE

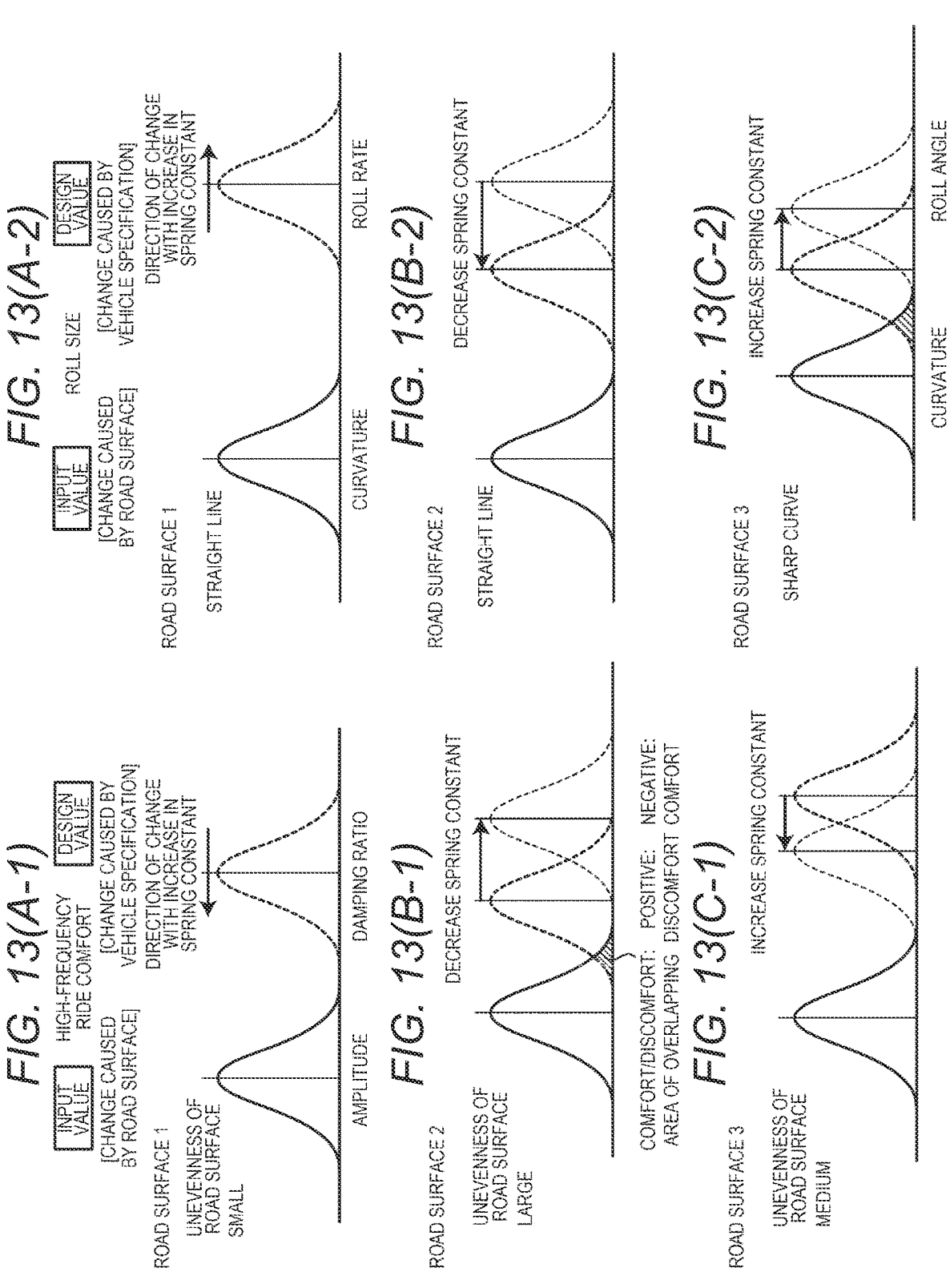

FIG. 15

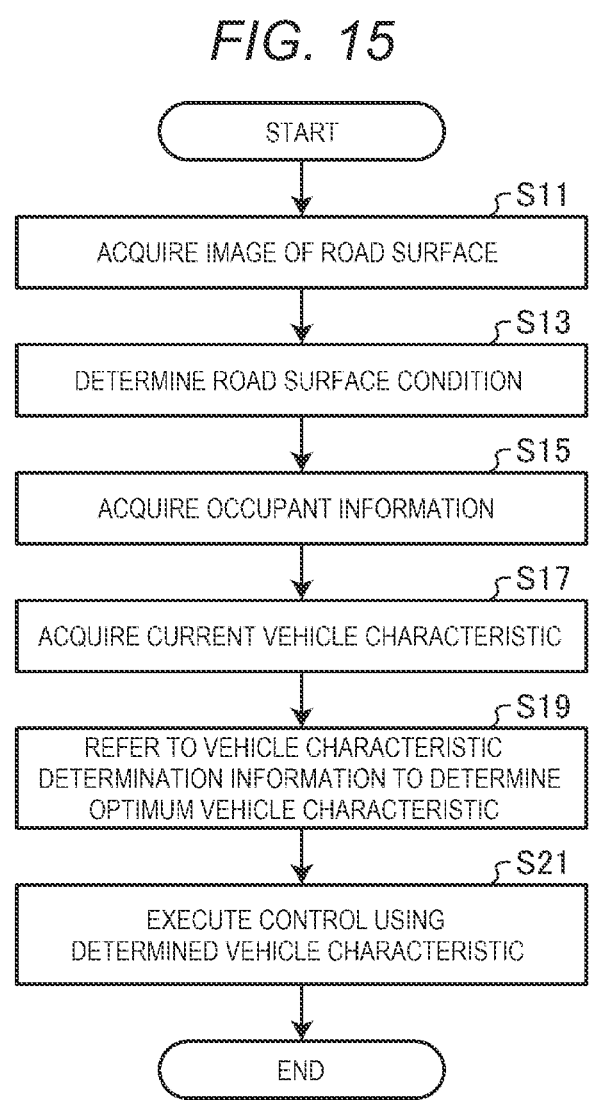

START

S11

ACQUIRE IMAGE OF ROAD SURFACE

S13

DETERMINE ROAD SURFACE CONDITION

S15

ACQUIRE OCCUPANT INFORMATION

S17

ACQUIRE CURRENT VEHICLE CHARACTERISTIC

S19

REFER TO VEHICLE CHARACTERISTIC
DETERMINATION INFORMATION TO DETERMINE
OPTIMUM VEHICLE CHARACTERISTIC

S21

EXECUTE CONTROL USING
DETERMINED VEHICLE CHARACTERISTIC

END

VEHICLE CONTROL DEVICE, ANALYSIS DEVICE, AND ANALYSIS METHOD

CROSS REFERENCE TO RELATED APPLICATIONS

This application is based on and claims priority under 35 U.S.C. § 119 to Japanese Patent Application 2023-015143, filed on Feb. 3, 2023, the entire content of which is incorporated herein by reference.

TECHNICAL FIELD

This disclosure relates to a vehicle control device, an analysis device, and an analysis method.

BACKGROUND DISCUSSION

A vehicle control device that controls various devices related to ride comfort, steering stability, and the like to optimize a vehicle characteristic based on detection values of various in-vehicle sensors such as a vertical acceleration sensor and a vehicle height sensor during traveling of a vehicle is known in the related art.

In such a vehicle control device, it is difficult to optimize conflicting vehicle characteristics such as ride comfort and steering stability when determining a vehicle characteristic. For example, in a suspension device in the related art, an adaptation trial is performed for a specification of a vehicle characteristic such as a main spring constant, a damping force, and a stabilizer spring constant so as to make conflicting vehicle characteristics appropriate, thereby determining a specification of a vehicle characteristic. In an electronic control suspension device or the like, a control range is determined by performing adaptation in order to widen an appropriate range of a vehicle characteristic.

Examples of the related art include JP 2013-147114A.

However, in the related art, whether ride comfort or steering stability is good or poor changes depending on a feeling or preference of an occupant, and it is difficult for a vehicle manufacturer to determine specifications of vehicle characteristics in consideration of all occupants. In addition, since a large number of states in road surface conditions and the like input to a vehicle control device are taken into consideration, it is difficult to determine an appropriate vehicle characteristic in consideration of all road surface conditions as road surfaces assumed by a vehicle manufacturer.

For example, in a condition, even when a damping force of a suspension is reduced in order to improve ride comfort, a roll amount increases when a vehicle turns, and steering stability is impaired. Even when a damping force is reduced in order to improve ride comfort of a high-frequency vibration, the damping force is insufficient in a low-frequency vibration, and thus ride comfort deteriorates. In addition, as an example of a performance change due to an environmental change, the way an occupant feels changes according to a change in a road surface condition, a change in weather, a change in a vehicle motion characteristic, a change in an attribute of an occupant, and a change in a condition of an occupant such as a physical condition.

A need thus exists for a vehicle control device, an analysis device, and an analysis method which are not susceptible to the drawback mentioned above.

SUMMARY

A vehicle control device according to an embodiment includes: an acquisition unit configured to acquire a road surface condition in a traveling direction of a vehicle and occupant information on an occupant of the vehicle; an analysis unit configured to obtain an optimum vehicle characteristic based on the road surface condition and the occupant information such that a probability density distribution of changes in the road surface condition does not overlap a probability density distribution of changes in a vehicle characteristic; and a control unit configured to control the vehicle using the optimum vehicle characteristic obtained by the analysis unit.

An analysis device according to an embodiment includes: an acquisition unit configured to acquire a road surface condition in a traveling direction of a vehicle and occupant information on an occupant of the vehicle; and an analysis unit configured to obtain an optimum vehicle characteristic based on the road surface condition and the occupant information such that a probability density distribution of changes in the road surface condition does not overlap a probability density distribution of changes in a vehicle characteristic.

An analysis method according to an embodiment is executed by a vehicle control device that controls a vehicle, and the analysis method includes: acquiring a road surface condition in a traveling direction of the vehicle and occupant information on an occupant of the vehicle; and obtaining an optimum vehicle characteristic based on the road surface condition and the occupant information such that a probability density distribution of changes in the road surface condition does not overlap a probability density distribution of changes in a vehicle characteristic.

BRIEF DESCRIPTION OF THE DRAWINGS

The foregoing and additional features and characteristics of this disclosure will become more apparent from the following detailed description considered with the reference to the accompanying drawings, wherein:

FIG. 1-1 is a perspective view illustrating a state in which a part of a vehicle cabin of a vehicle according to a first embodiment is seen through;

FIG. 1-2 is a plan view illustrating the vehicle according to the first embodiment;

FIG. 2 is a view illustrating an example of an arrangement of an imaging device provided in the vehicle according to the first embodiment;

FIG. 8 is a diagram illustrating a graph of a stress-strength model in reliability engineering;

FIG. 10 is a diagram illustrating an example of a data structure of vehicle characteristic determination information according to the first embodiment;

FIGS. 13(A-1) to 13(C-2) are diagrams illustrating an example of probability density distributions of changes caused by a road surface and changes caused by a vehicle characteristic for each road surface in the first embodiment;

FIG. 15 is a flowchart illustrating an example of a procedure of vehicle control processing executed by the vehicle control system according to the first embodiment;

DETAILED DESCRIPTION

Hereinafter, embodiments disclosed here will be described. Configurations of embodiments to be described below, and operations, results, and effects of the configurations are examples. Embodiments disclosed here can be implemented by configurations other than the configurations disclosed in the embodiments to be described below, and at least one of various effects based on a basic configuration and a derivative effect can be obtained.

First Embodiment

A vehicle 1 according to the present embodiment may be, for example, an automated vehicle using an internal combustion engine (not illustrated) as a drive source, that is, an internal combustion engine automated vehicle, an automated vehicle using an electric motor (not illustrated) as a drive source, that is, an electric automated vehicle, a fuel cell automated vehicle, or the like, a hybrid automated vehicle using both of an internal combustion engine and an electric motor as a drive source, or an automated vehicle including another drive source. In addition, the vehicle 1 can be equipped with various transmission devices, and can be equipped with various devices such as systems and components necessary for driving an internal combustion engine and an electric motor. A system, the number, a layout, and the like of devices related to driving of wheels 3 of the vehicle 1 can be set in various manners.

Figure 1:
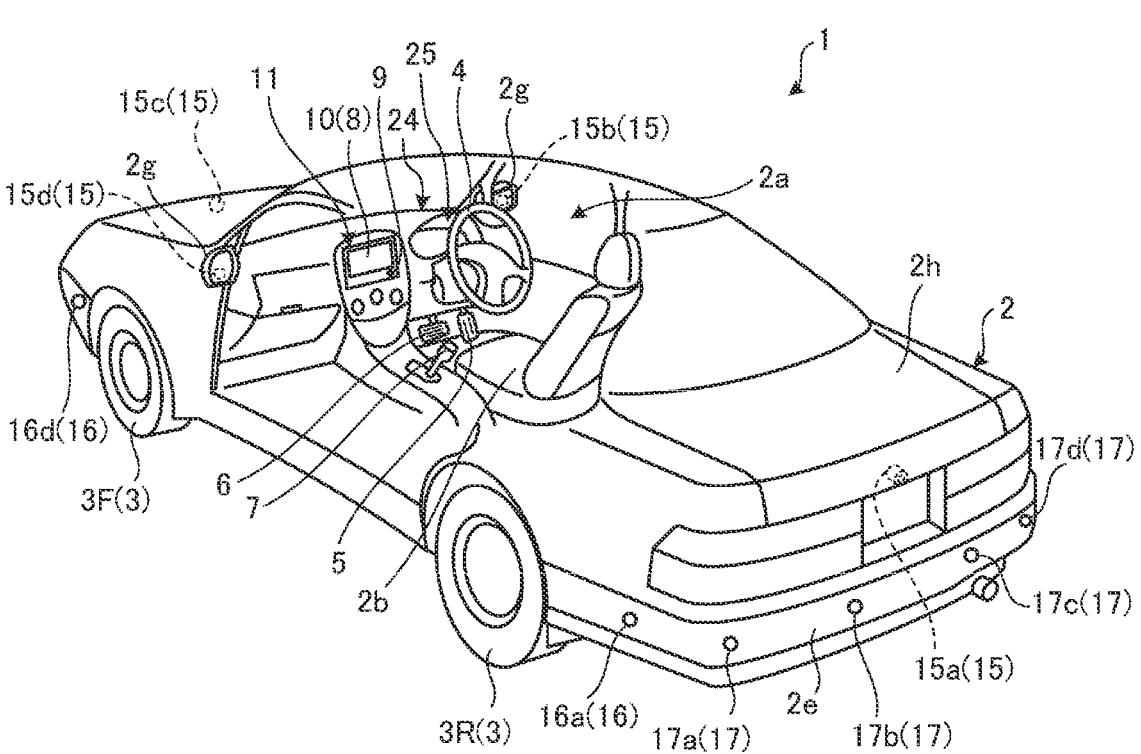
Figure 2:
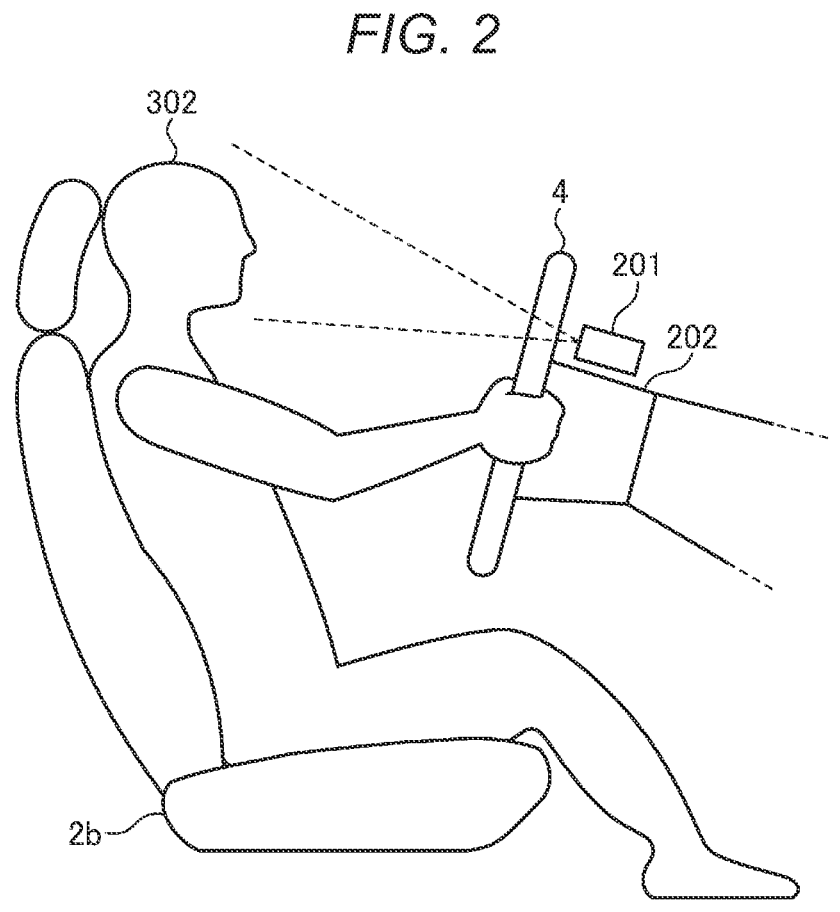
Figure 3:
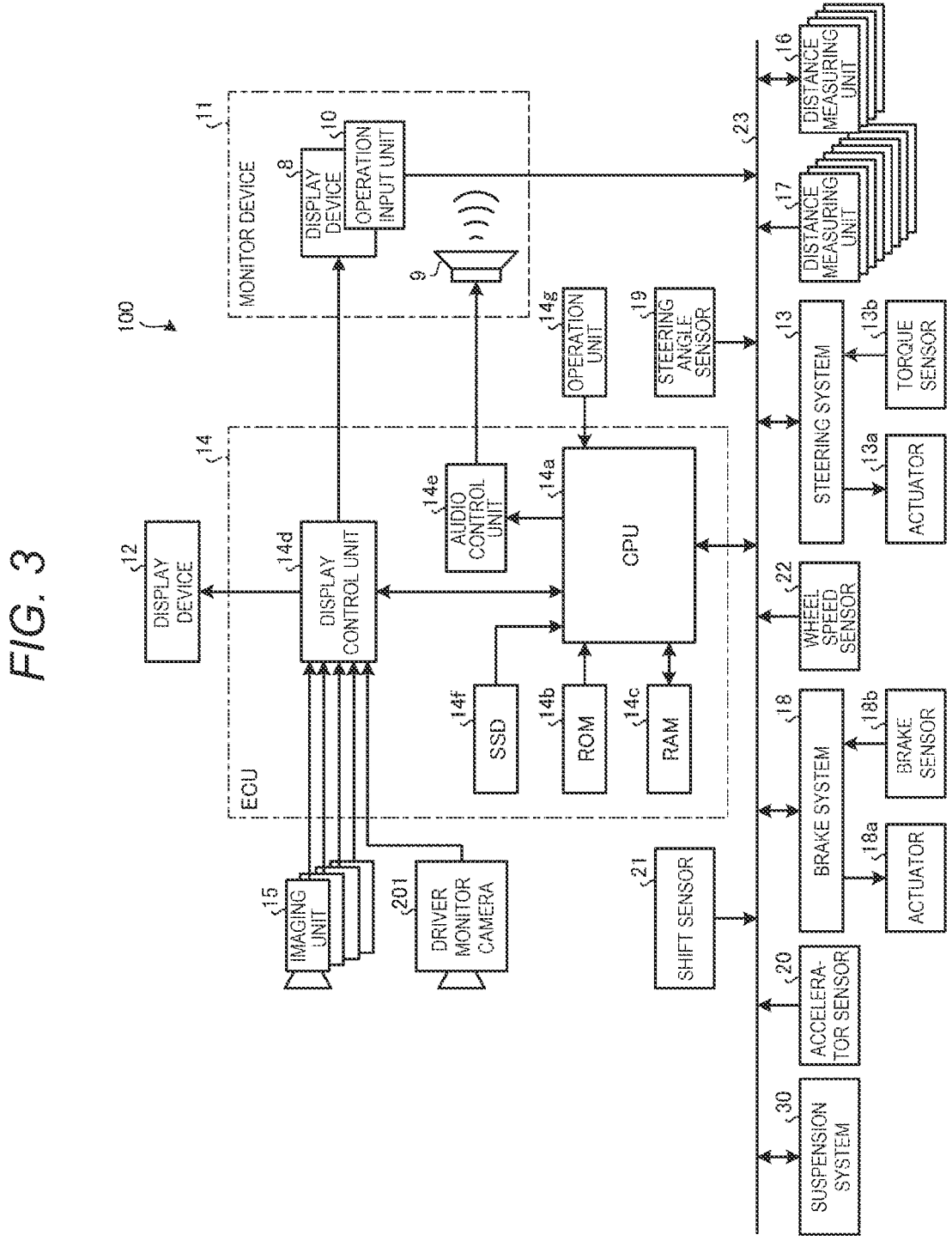
FIG. 3 is a block diagram illustrating a configuration of a vehicle control system provided in the vehicle according to the first embodiment.

FIG. 1-1 is a perspective view illustrating a state in which a part of a vehicle cabin of a vehicle according to the first embodiment is seen through. FIG. 1-2 is a plan view illustrating the vehicle according to the first embodiment. FIG. 2 is a view illustrating an example of an arrangement of an imaging device provided in the vehicle according to the first embodiment. FIG. 3 is a block diagram illustrating a configuration of a vehicle control system provided in the vehicle according to the first embodiment.

First, an example of a configuration of the vehicle 1 according to the present embodiment will be described with reference to FIG. 1-1 to FIG. 3.

As illustrated in FIG. 1-1, a vehicle body 2 constitutes a vehicle cabin 2a in which an occupant (not illustrated) rides. In the vehicle cabin 2a, a steering unit 4, an acceleration operation unit 5, a braking operation unit 6, a gear shift operation unit 7, and the like are provided in a state of facing a seat 2b for a driver serving as an occupant.

The steering unit 4 is, for example, a steering wheel protruding from a dashboard 24. The acceleration operation unit 5 is, for example, an accelerator pedal located under a foot of the driver. The braking operation unit 6 is, for example, a brake pedal located under a foot of the driver. The gear shift operation unit 7 is, for example, a shift lever protruding from a center console. The steering unit 4, the acceleration operation unit 5, the braking operation unit 6, the gear shift operation unit 7, and the like are not limited thereto.

A display device 8 serving as a display output unit and an audio output device 9 serving as an audio output unit are provided in the vehicle cabin 2a. The display device 8 is, for example, a liquid crystal display (LCD) or an organic electroluminescent display (OELD). The audio output device 9 is, for example, a speaker. The display device 8 is covered with a transparent operation input unit 10 such as a touch panel. An occupant can visually recognize an image displayed on a display screen of the display device 8 via the operation input unit 10. The occupant can perform an operation input by touching, pressing, or moving the operation input unit 10 with a finger or the like at a position corresponding to the image displayed on the display screen of the display device 8.

The display device 8, the audio output device 9, the operation input unit 10, and the like are provided in, for example, a monitor device 11 located in a center portion of the dashboard 24 in a vehicle width direction, that is, a left-right direction. The monitor device 11 may include an operation input unit (not illustrated) such as a switch, a dial, a joystick, and a push button. An audio output device (not illustrated) may be provided at another position in the vehicle cabin 2a different from the monitor device 11, and audio may be output from the audio output device 9 of the monitor device 11 and another audio output device. The monitor device 11 may be used as, for example, a navigation system or an audio system. A display device 12 different from the display device 8 is provided in the vehicle cabin 2a.

As illustrated in FIG. 2, a driver monitor camera 201 is installed on a steering wheel column 202. The driver monitor camera 201 is, for example, a charge coupled device (CCD) camera. A viewing angle and a posture of the driver monitor camera 201 are adjusted such that a face of a driver 302 seated in the seat 2b is positioned at the center of the field of view. The driver monitor camera 201 sequentially captures images of the face of the driver 302 and sequentially outputs image data of the captured images.

As illustrated in FIGS. 1-1 and 1-2, the vehicle 1 is, for example, a four-wheel automated vehicle, and includes two left and right front wheels 3F and two left and right rear wheels 3R. Each of the four wheels 3 may be configured to be steerable. As illustrated in FIG. 3, the vehicle 1 includes a steering system 13 that steers at least two wheels 3.

As illustrated in FIG. 3, the steering system 13 includes an actuator 13a and a torque sensor 13b. The steering system 13 is electrically controlled by an electronic control unit (ECU) 14 or the like to operate the actuator 13a. The steering system 13 is, for example, an electric power steering system or a steer by wire (SBW) system. The steering system 13 causes the actuator 13a to add torque, that is, assist torque, to the steering unit 4 to compensate a steering force, and causes the actuator 13a to steer the wheel 3. In this case, the actuator 13a may turn one wheel 3 or a plurality of wheels 3. The torque sensor 13b detects, for example, torque applied to the steering unit 4 by a driver.

As illustrated in FIG. 3, the vehicle body 2 is provided with, for example, four imaging units 15a to 15d as a plurality of imaging units 15. The imaging unit 15 is, for example, a digital camera including an imaging element such as a charge coupled device (CCD) or a CMOS image sensor (CIS). The imaging unit 15 can output video data at a predetermined frame rate. The imaging unit 15 has a wide-angle lens or a fish eye lens, and can image a range of, for example, 140° to 190° in a horizontal direction. An optical axis of the imaging unit 15 is set to be obliquely downward. Accordingly, the imaging unit 15 sequentially captures images of an external environment around the vehicle body 2 including a road surface on which the vehicle 1 can move and a region in which the vehicle 1 can be parked, and outputs the captured images as captured image data.

The imaging unit 15a is located, for example, on an end portion 2e on a rear side of the vehicle body 2, and is provided on a wall portion below a door 2h of a rear trunk. The imaging unit 15b is located, for example, on an end portion 2f on a right side of the vehicle body 2, and is provided on a right door mirror 2g. The imaging unit 15c is located, for example, on a front side of the vehicle body 2, that is, on an end portion 2c on a front side in a vehicle front-rear direction, and is provided on a front bumper or the like. The imaging unit 15d is located, for example, on a left side of the vehicle body 2, that is, on an end portion 2d on a left side in the vehicle width direction, and is provided on a door mirror 2g serving as a left protrusion portion. The ECU 14 can execute calculation processing and image processing based on image data obtained by the plurality of imaging units 15, and can form an image having a wider viewing angle or form a virtual bird's eye view image of the vehicle 1 viewed from the above. The bird's eye view image can also be referred to as a planar image.

In the present embodiment, the imaging unit 15c serving as an imaging device provided on a front side of the vehicle body 2 captures an image of a road surface in front of the vehicle 1 in a traveling direction. When the vehicle 1 moves backward, a rear side of the vehicle 1 may be a traveling direction, and the imaging unit 15a may be configured to capture an image of a road surface in the rear of the vehicle 1.

As illustrated in FIGS. 1-1 and 1-2, the vehicle body 2 is provided with, for example, four distance measuring units 16a to 16d and eight distance measuring units 17a to 17h as a plurality of distance measuring units 16 and 17. The distance measuring units 16 and 17 are, for example, sonars that emit ultrasonic waves and capture reflected waves. The sonar can also be referred to as a sonar sensor or an ultrasonic detector. The ECU 14 can detect whether there is an object such as an obstacle located around the vehicle 1 and can measure a distance to the object based on detection results of the distance measuring units 16 and 17. That is, the distance measuring units 16 and 17 are examples of a detection unit that detects an object. The distance measuring unit 17 may be used to detect, for example, an object at a relatively short distance, and the distance measuring unit 16 may be used to detect, for example, an object at a relatively long distance farther than that of the distance measuring unit 17. For example, the distance measuring unit 17 can be used to detect objects in front of and in the rear of the vehicle 1, and the distance measuring unit 16 can be used to detect an object on a side of the vehicle 1.

As illustrated in FIG. 3, in a vehicle control system 100, a brake system 18, a suspension system 30, a steering angle sensor 19, an accelerator sensor 20, a shift sensor 21, a wheel speed sensor 22, and the like are electrically connected via an in-vehicle network 23 serving as an electric communication line, in addition to the ECU 14, the monitor device 11, the steering system 13, the distance measuring units 16 and 17. The in-vehicle network 23 is implemented as, for example, a controller area network (CAN).

The ECU 14 can control the steering system 13, the brake system 18, and the like by transmitting a control signal via the in-vehicle network 23. The ECU 14 can receive, via the in-vehicle network 23, detection results of the torque sensor 13b, a brake sensor 18b, the steering angle sensor 19, the distance measuring unit 16, the distance measuring unit 17, the accelerator sensor 20, the shift sensor 21, the wheel speed sensor 22, and the like, and an operation signal of the operation input unit 10 and the like.

The ECU 14 includes, for example, a central processing unit (CPU) 14a, a read only memory (ROM) 14b, a random access memory (RAM) 14c, a display control unit 14d, an audio control unit 14e, and a solid state drive (SSD, a flash memory) 14f.

The CPU 14a can executes various kinds of calculation processing and control such as image processing related to images displayed on the display devices 8 and 12, determination of a target position of the vehicle 1, calculation of a movement path of the vehicle 1, determination of presence or absence of interference with an object, automated control of the vehicle 1, automated control cancellation, damping control of the suspension system 30, spring constant switching control, steering control, and stabilizer control. The CPU 14a can read a program installed and stored in a nonvolatile storage device such as the ROM 14b and execute calculation processing according to the program.

The RAM 14c temporarily stores various kinds of data used in calculation executed by the CPU 14a. The display control unit 14d mainly executes image processing using image data obtained by the imaging unit 15, synthesis of image data displayed on the display device 8, and the like among calculation processing executed by the ECU 14. The audio control unit 14e mainly executes processing of audio data output by the audio output device 9 among calculation processing executed by the ECU 14. The SSD 14f is a rewritable nonvolatile storage unit, and can store data even when the ECU 14 is powered off. The CPU 14a, the ROM 14b, the RAM 14c, and the like may be integrated in the same package. The ECU 14 may be configured to use another logical calculation processor such as a digital signal processor (DSP), a logic circuit, or the like instead of the CPU 14a. A hard disk drive (HDD) may be provided instead of the SSD 14f, and the SSD 14f and the HDD may be provided separately from the ECU 14.

The brake system 18 is, for example, an anti-lock brake system (ABS) that prevents locking of a brake, a side-skid prevention device (electronic stability control (ESC)) that prevents a side-skid of the vehicle 1 at the time of cornering, an electric brake system that enhances a braking force (executes a brake assist), and brake by wire (BBW). The brake system 18 applies a braking force to the wheel 3 and the vehicle 1 via an actuator 18a. In addition, the brake system 18 can detect locking of a brake, idling of the wheel 3, a sign indicating a side skid, and the like based on a rotation difference between the left and right wheels 3 and the like, and execute various kinds of control. The brake sensor 18*b* is, for example, a sensor that detects a position of a movable portion of the braking operation unit 6. The brake sensor 18*b* can detect a position of a brake pedal serving as a movable portion. The brake sensor 18*b* includes a displacement sensor.

The steering angle sensor 19 is, for example, a sensor that detects a steering amount of the steering unit 4 such as a steering wheel. The steering angle sensor 19 includes, for example, a Hall element. The ECU 14 acquires a steering amount of the steering unit 4 applied by a driver, steering amounts of the wheels 3 during automated steering, and the like from the steering angle sensor 19, and executes various kinds of control. The steering angle sensor 19 detects a rotation angle of a rotation portion provided in the steering unit 4.

The accelerator sensor 20 is, for example, a sensor that detects a position of a movable portion of the acceleration operation unit 5. The accelerator sensor 20 can detect a position of an accelerator pedal serving as the movable portion. The accelerator sensor 20 includes a displacement sensor.

The shift sensor 21 is, for example, a sensor that detects a position of a movable portion of the gear shift operation unit 7. The shift sensor 21 can detect a position of a lever, an arm, a button, and the like serving as the movable portion. The shift sensor 21 may include a displacement sensor or may be implemented as a switch.

The wheel speed sensor 22 is a sensor that detects a rotation mount of the wheel 3 and a rotation speed per unit time. The wheel speed sensor 22 outputs a wheel speed pulse number indicating the detected rotation speed as a sensor value. The wheel speed sensor 22 may include, for example, a Hall element. The ECU 14 calculates a movement amount and the like of the vehicle 1 based on the sensor value acquired from the wheel speed sensor 22, and executes various kinds of control. The wheel speed sensor 22 may be provided in the brake system 18. In this case, the ECU 14 acquires a detection result of the wheel speed sensor 22 via the brake system 18.

The suspension system 30 is disposed between the vehicle body 2 and the wheel 3 of the vehicle 1. The suspension system 30 includes a spring that absorbs a vibration of the vehicle 1 caused by an impact on the vehicle 1 from a road surface, and a damping force variable damper that can damp a vibration of the spring and change a damping force of the vibration of the spring. In the present embodiment, the suspension system 30 cooperates with the ECU 14 to control a damping force adjusting device such as a solenoid actuator to change a damping force of the damping force variable damper. The suspension system 30 implements an adaptive variable suspension system (AVS) that damps vibrations in an up-down direction, a lateral direction, and a front-rear direction of the vehicle body caused by an impact on the vehicle 1 from a road surface.

An acceleration sensor (not illustrated) is provided in the vicinity of a portion of the vehicle closer to the vehicle body 2 than the suspension system 30 (also called a sprung portion) and a portion of the vehicle 1 closer to the wheel 3 than the suspension system 30 (also called an unsprung portion).

Configurations, arrangements, electrical connection forms, and the like of various sensors and actuators described above are merely examples, and can be set (changed) in various manners.

Here, performance of the suspension system 30 includes high-frequency ride comfort, low-frequency ride comfort, a roll size, a ground contact property, steering effectiveness, a rear (Rr) firm feeling, and the like. However, the performance may conflict with one another.

Figure 4:
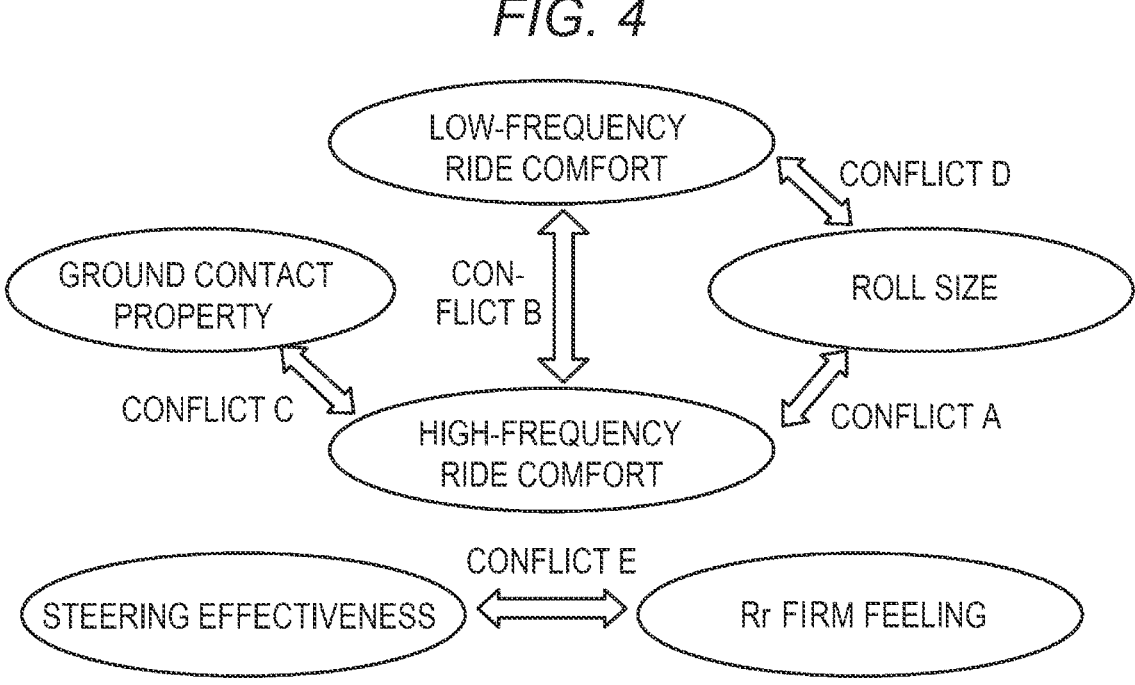
FIG. 4 is a schematic diagram illustrating conflicting performance of a suspension system according to the first embodiment.

FIG. 4 is a schematic diagram illustrating conflicting performance of the suspension system 30 according to the first embodiment.

As illustrated in FIG. 4, the high-frequency ride comfort and the roll size conflict with each other (a conflict A), the high-frequency ride comfort and the low-frequency ride comfort conflict with each other (a conflict B), the high-frequency ride comfort and the ground contact property conflict with each other (a conflict C), and the steering effectiveness and the Rr firm feeling conflict with each other (a conflict D).

First, the conflict between the high-frequency ride comfort and the roll size (the conflict A) will be described.

The high-frequency ride comfort refers to ride comfort due to a high-frequency vibration of the sprung portion of the suspension system 30. The high-frequency vibration is referred to as, for example, a tremble feel and harshness in which a user feels a suspension vibration or an engine vibration of 10 Hz or more. A roll refers to a lateral shake which is a vibration of a horizontal component applied to the vehicle 1 due to a road surface condition or the like.

Figure 5:
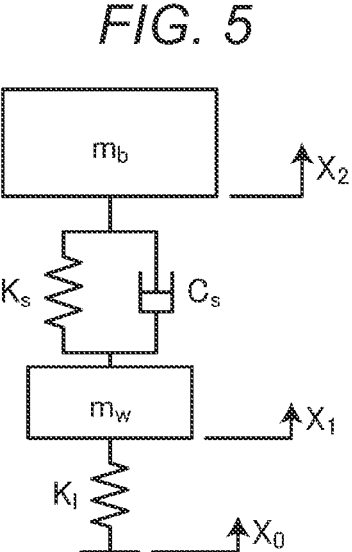
FIG. 5 is a diagram illustrating a vehicle two-degree-of-freedom model.

FIG. 5 is a diagram illustrating a vehicle two-degree-of-freedom model. In the model, $K_s$ represents a spring constant of the suspension system 30, and $C_s$ represents a damping coefficient of the suspension system 30. $K_t$ is a spring constant of a tire. Mass mw is a mass constituted by a brake or a wheel below the suspension system 30, and is referred to as an unsprung mass. A mass $m_b$ is a mass constituted by a vehicle body, an occupant, and the like on the suspension system 30, and is referred to as a sprung mass. $X_0$ indicates a road surface displacement, $X_1$ indicates an unsprung displacement, and $X_2$ indicates a sprung displacement.

In this case, overall power P of a sprung acceleration, which is an index of the high-frequency ride comfort, is expressed by the following Formula (1) (see "Automotive Engineering-Basic-" Society of Automotive Engineers of Japan, Inc., p. 138). Here, $\omega_1$, $\omega_2$, $\mu$, and $\zeta$ in Formula (1) are expressed by Formula (2). Formula (1) is simplified to Formula (3).

$$P = \pi \cdot \frac{4\omega_1^2 \omega_2 \zeta^2 + (\mu + 1)\omega_2^3}{4\mu\zeta} \tag{1}$$

$$\omega_1 = \sqrt{K_t/m_w},\ \omega_2 = \sqrt{K_s/m_b},\ \mu = m_b/m_w,\ \zeta = C_s/2\sqrt{m_b K_s} \tag{2}$$

$$P = a + bK_s^2 \tag{3}$$

In order to improve the high-frequency ride comfort, the overall power P of the sprung acceleration is preferably small. Therefore, it is preferable that the spring constant $K_s$ of a suspension has a value smaller than that in Formula (3).

Figure 6:
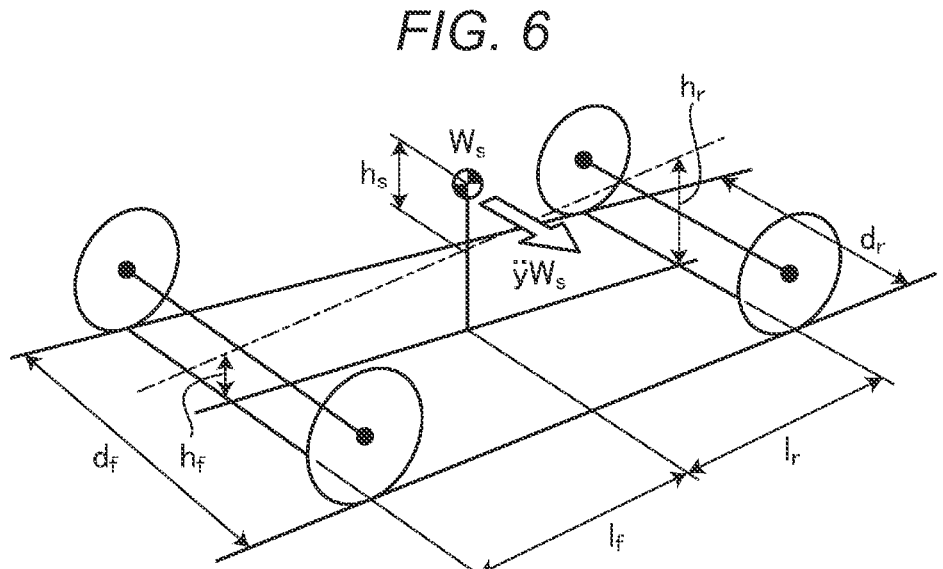
FIG. 6 is a vehicle schematic view illustrating a height of a roll center and a height of a center of gravity of a vehicle body.

FIG. 6 is a vehicle schematic view illustrating a height of a roll center and a height of a center of gravity of the vehicle body.

Here, $W_s$ represents a vehicle body weight, and a second-order differential of y represents a lateral acceleration of the vehicle body. Roll rigidities of front and rear suspensions are denoted by $K_{\varphi f}$ and $K_{\varphi r}$, front and rear roll center heights from the ground are denoted by $h_f$ and $h_r$, treads of front and rear wheels are denoted by $d_f$ and $d_r$, a distance between the center of gravity of the vehicle body and a roll axis is denoted by $h_s$, and distances between front and rear axles and the center of gravity of the vehicle in a horizontal plane are denoted by $I_f$ and $I_r$. In this case, a roll angle $\varphi$ is expressed by Formula (4) (see "Automotive Vehicle Dynamics 2nd Edition", Tokyo Denki University Press, p. 175, 176). A roll rate $R_a$ which is an index indicating a roll size in Formula (4) is expressed by Formula (5).

$$\phi = \frac{\ddot{y}W_s h_s}{K_{\phi f} + K_{\phi r} - W_s h_s} \qquad (4)$$

$\ddot{y}$: LATERAL ACCELERATION, $\ddot{y}W_s$: INERTIAL FORCE $$R_a = \frac{d}{K_s} \qquad (5)$$

In order to improve the roll size, the roll rate is preferably small. Therefore, it is preferable that the spring constant $K_s$ of the suspension system 30 has a value larger than that in Formula (5).

As described above, in order to improve the high-frequency ride comfort, the spring constant $K_s$ of the suspension system 30 is preferably small, and on the other hand, in order to improve the roll size, the spring constant $K_s$ of the suspension system 30 is preferably large. Accordingly, improvement of the high-frequency ride comfort and improvement of the roll size conflict with each other.

Next, the conflict between the high-frequency ride comfort and the low-frequency ride comfort (the conflict B) will be described.

The low-frequency ride comfort refers to ride comfort due to a low-frequency vibration of the sprung portion of the suspension system 30. The low-frequency vibration is mainly a vehicle body vibration caused by a spring of the suspension system 30, and is a float vibration of 1 Hz to 2 Hz. The low-frequency vibration may be referred to as a float feel.

When the sprung displacement $X_2$ relative to the road surface displacement $X_0$ is expressed by a transfer function based on the vehicle two-degree-of-freedom model illustrated in FIG. 5, a vibration transmission ratio $X_2/X_0$ is expressed by Formula (6) (see "Automotive Engineering-Basic-" Society of Automotive Engineers of Japan, Inc., p. 137). Here, for the sprung displacement, s represents a Laplace operator, and $\omega_1$, $\omega_2$, $\mu$, and $\zeta$ are expressed by Formula (7).

$$\frac{X_2(s)}{X_0(s)} = \frac{\left(2\zeta\omega_1^2\omega_2\right)s + \omega_1^2\omega_2^2}{s^4 + 2\mu\zeta\omega_2 s^3 + \left(\omega_1^2 + \mu\omega_2^2\right) + 2\zeta\omega_1^2\omega_2 s + \omega_1^2\omega_2^2} \qquad (6)$$

$$\omega_1^2 = \frac{K_l}{m_w}, \omega_2^2 = \frac{K_s}{m_b}, \mu = \frac{m_w + m_b}{m_w}, \zeta = \frac{C_s}{2\sqrt{m_b K_s}} \qquad (7)$$

In Formula (6), $s=j\omega$ is substituted to calculate a frequency response function.

Figure 7:
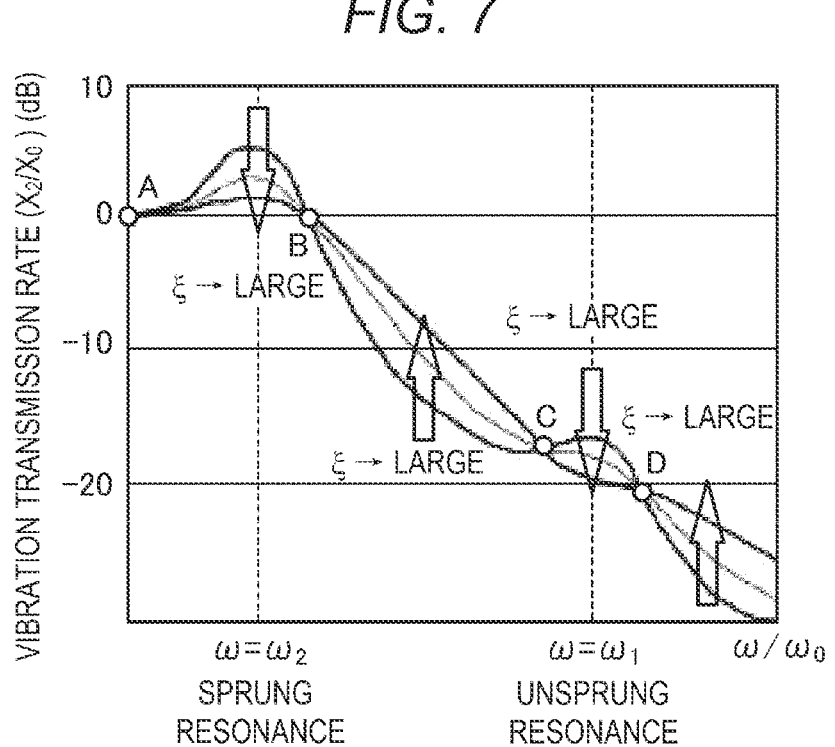
FIG. 7 is a diagram illustrating an example of a graph of a frequency response function.

FIG. 7 is a diagram illustrating an example of a graph of the frequency response function (see "Automotive Engineering-Basic-" Society of Automotive Engineers of Japan, Inc.). In the graph illustrated in FIG. 7, a horizontal axis represents a frequency, and a vertical axis represents the vibration transmission ratio $X_2/X_0$.

As illustrated in FIG. 7, in a low-frequency region, when $\zeta$ increases, the vibration transmission ratio $X_2/X_0$ decreases (that is, a low-frequency vibration decreases), and the low-frequency ride comfort is improved. On the other hand, in a high-frequency region, when z decreases, the vibration transmission ratio $X_2/X_0$ decreases (that is, a high-frequency vibration decreases), and the high-frequency ride comfort is improved.

Here, $\zeta$ is represented by a damping coefficient $C_s$ from Formula (7), and therefore, the damping coefficient $C_s$ is preferably large in order to improve the low-frequency ride comfort, and the damping coefficient $C_s$ is preferably small in order to improve the high-frequency ride comfort. Accordingly, improvement of the high-frequency ride comfort and improvement of the low-frequency ride comfort conflict with each other.

Therefore, such a problem is solved by employing a concept of a failure probability in reliability engineering in the present embodiment.

Generally, reliability is determined by a relationship between a strength unique to a product and a stress (also referred to as a "load") applied to the product. A failure may occur when the stress equal to or larger than the strength of the product is applied. (see, for example, "Introduction to Reliability Engineering" by Hiroshi Shiomi, Maruzen Group).

Figure 8:
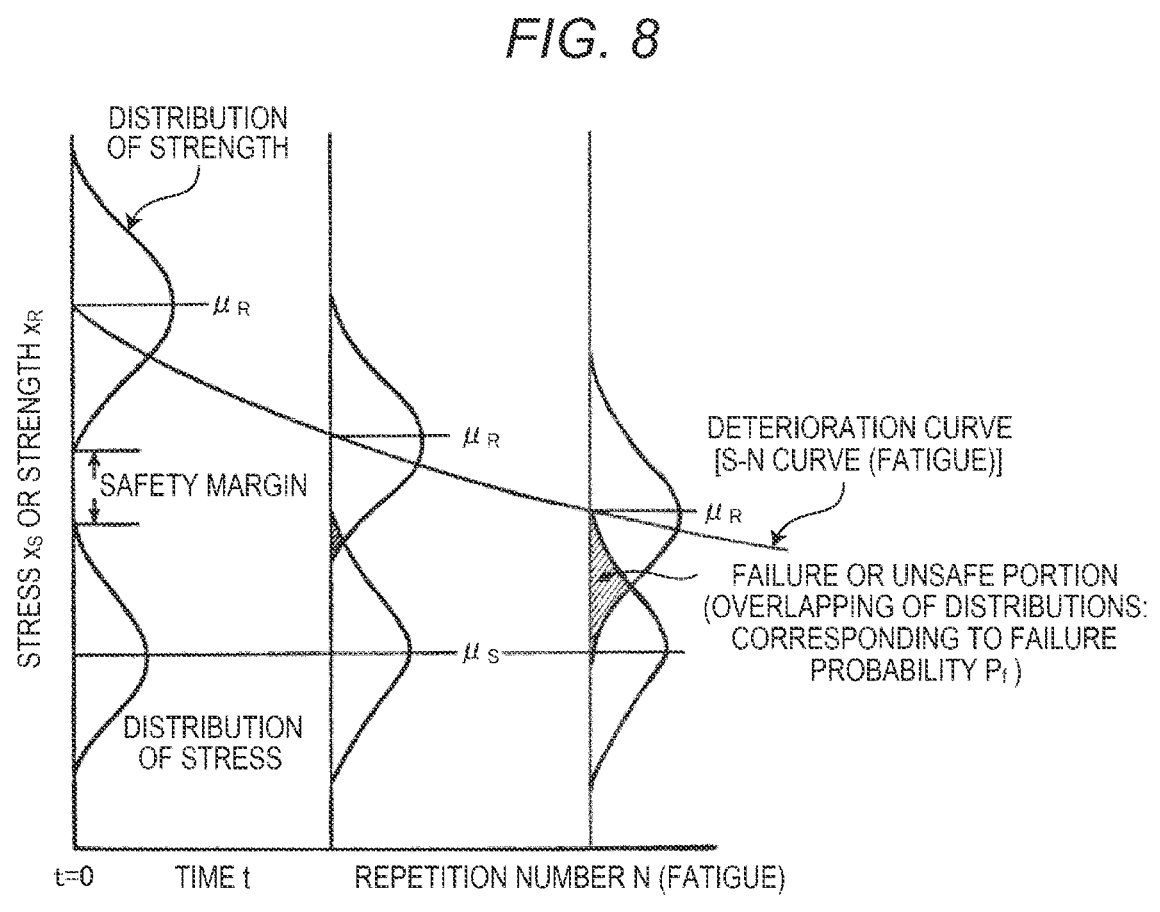

FIG. 8 is a diagram illustrating a graph of a stress-strength model in reliability engineering (see "Introduction to Reliability Engineering" by Hiroshi Shiomi, Maruzen Group). In the graph illustrated in FIG. 8, a horizontal axis represents time, and a vertical axis represents stress or strength. As illustrated in FIG. 8, at a time t=0, a probability density distribution of a strength of an item and a probability density distribution of stress acting on the item do not overlap each other, and an interval called a safety margin exists between the two distributions. When the two probability density distributions do not overlap each other and there is a safety margin, no failure occurs.

However, even when a sufficient safety margin is taken into consideration between the two distributions in this manner, as illustrated in FIG. 8, the strength deteriorates over time as indicated by a deterioration curve, and finally, the probability density distribution of the strength overlap the probability density distribution of the stress. An overlapping portion in which the stress is larger than the strength occurs, and a failure occurs.

In the present embodiment, the concept of the failure probability in reliability engineering is applied to "occupant comfort" and the concept is to be considered as follows.

Comfort is determined by a relationship between sensitivity unique to an occupant (a strength unique to a product) and momentum (stress) applied to the occupant. A discomfort feeling is regarded as a failure, and the discomfort feeling occurs when the momentum equal to or greater than that in the discomfort feeling is applied.

The sensitivity unique to an occupant changes depending on an attribute of the occupant (for example, age, gender, a height, a weight, and a physical condition).

The momentum of an occupant changes depending on a specification of the vehicle (for example, a mass, a spring constant, a damping force, a wheel base, and a height of a center of gravity), a riding position of the occupant, and an input to the vehicle (road surface unevenness, a road surface u, a vehicle speed, and the like).

In the present embodiment, changes in the sensitivity unique to an occupant and changes in the momentum of an occupant are captured as probability density distributions (normal distributions), and an average value and a standard deviation of the probability density distributions are assumed to change. A failure probability, that is, a discomfort feeling probability, is estimated based on an overlapping amount of the probability density distributions. In the present embodiment, the above-described deterioration curve is further considered in occupant information to be described later.

Hereinafter, a specific configuration of the embodiment will be described.

Figure 9:
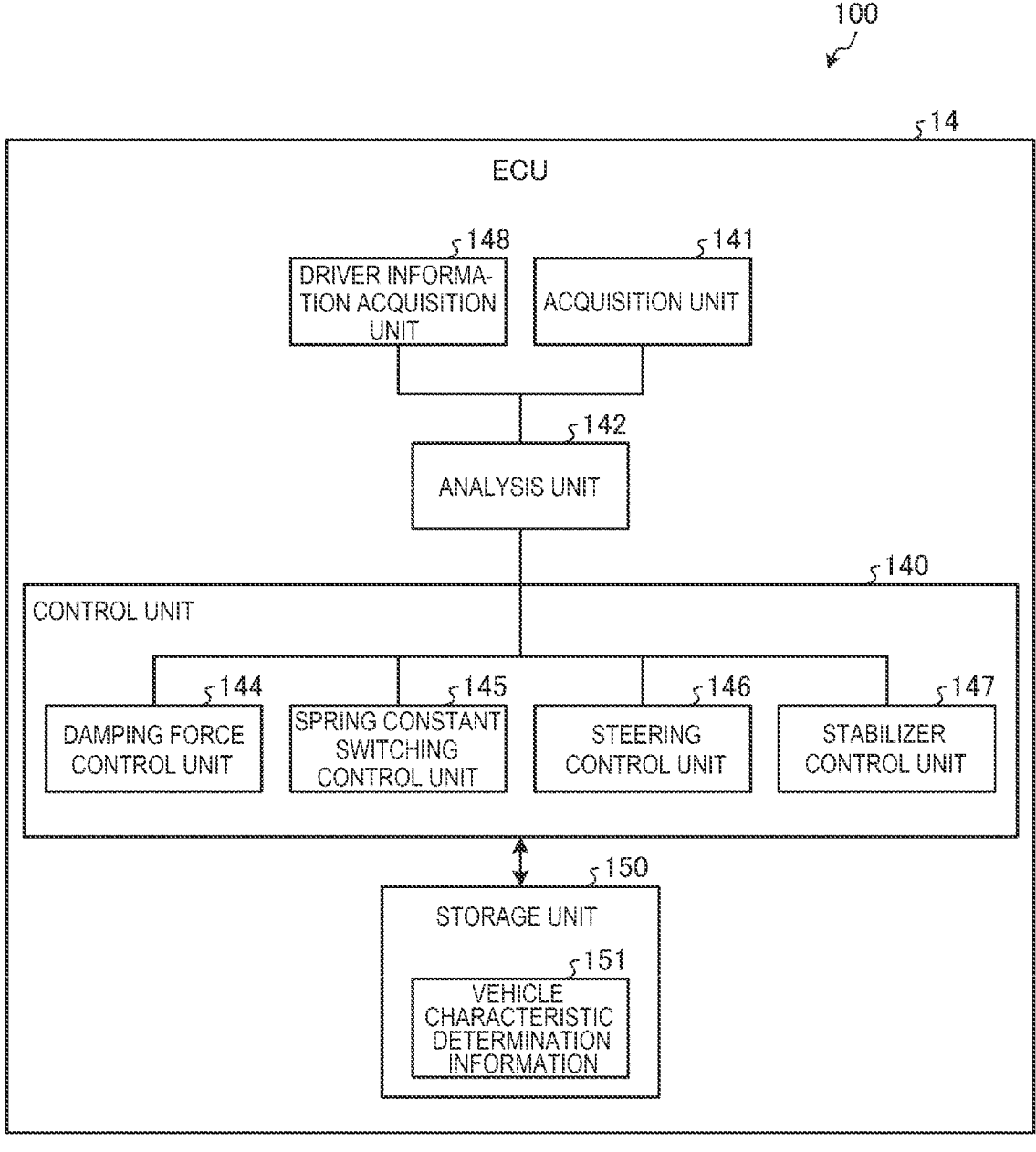
FIG. 9 is a diagram illustrating an example of a functional configuration of an ECU provided in the vehicle according to the first embodiment.

First, an example of a functional configuration of the ECU 14 provided in the vehicle 1 according to the present embodiment will be described with reference to FIG. 9. FIG. 9 is a diagram illustrating an example of a functional configuration of the ECU 14 provided in the vehicle according to the first embodiment.

As illustrated in FIG. 9, the ECU 14 according to the present embodiment functions as a vehicle control device including at least an acquisition unit 141, a driver information acquisition unit 148, an analysis unit 142, a control unit 140, and a storage unit 150. The acquisition unit 141, the driver information acquisition unit 148, the analysis unit 142, and the storage unit 150 function as an analysis device.

As illustrated in FIG. 9, the control unit 140 mainly includes a damping force control unit 144, a spring constant switching control unit 145, a steering control unit 146, and a stabilizer control unit 147.

Various functional modules such as the acquisition unit 141, the driver information acquisition unit 148, the analysis unit 142, the damping force control unit 144, the spring constant switching control unit 145, the steering control unit 146, and the stabilizer control unit 147 are examples, and the functional modules may be integrated or subdivided as along as similar functions can be achieved.

The driver information acquisition unit 148 analyzes an image captured by the driver monitor camera 201 and acquires occupant information on an occupant such as the driver 302 or a passenger of the vehicle 1. The driver information acquisition unit is an example of an acquisition unit. For example, the driver information acquisition unit 148 acquires a riding position of an occupant, an attribute of the occupant, a state of the occupant, and the like as the occupant information based on the captured image.

Specifically, the driver information acquisition unit 148 can estimate a riding position of the occupant in the vehicle cabin based on a position of the occupant reflected in the image captured by the driver monitor camera 201. In addition, the driver information acquisition unit 148 estimates attributes of the occupant such as gender, age, and physique based on a face image, a whole body image, and the like of the occupant reflected in the driver monitor camera 201.

The driver information acquisition unit 148 can detect a heartbeat, respiration, and the like of the occupant based on a movement and the like of a chest of the occupant reflected by the driver monitor camera 201. Furthermore, the driver information acquisition unit 148 may be configured to estimate a secretion amount of dopamine, serotonin, or the like that can be used to estimate a state of the occupant according to an experimental expression or the like based on the detected heartbeat, respiration, and the like of the occupant.

The occupant information defines the deterioration curve in the stress-strength model of the above-described reliability engineering. That is, for example, determination of comfort or discomfort changes, and the interval between the two probability density distributions also changes depending on the occupant information such as age of an occupant. Therefore, in the present embodiment, the deterioration curve is determined by the occupant information, and the occupant information is used as a determination element for determining an optimum vehicle characteristic.

The acquisition unit 141 acquires a road surface condition in a traveling direction of the vehicle 1. Specifically, the acquisition unit 141 acquires a captured image obtained by capturing an image of a road surface in the traveling direction of the vehicle 1, which is captured by the imaging unit 15c, analyzes the captured image, and determines an undulation state (that is, an unevenness state) of the road surface as the road surface condition.

The acquisition unit 141 acquires a current vehicle characteristic of the vehicle 1. Specifically, the acquisition unit 141 acquires detection information from various in-vehicle sensors and obtains a vehicle characteristic based on the detection information. In the present embodiment, for example, a vehicle characteristic based on a sprung acceleration or an unsprung acceleration, and further a high-frequency vibration, a low-frequency vibration, a roll rate, and the like are obtained from acceleration sensors provided in the vicinity of the sprung portion of the suspension system 30 and the unsprung portion of the suspension system 30. Here, the vehicle characteristic is also referred to as a vehicle specification.

The storage unit 150 is a storage medium such as an HDD or an SSD. The storage unit 150 stores vehicle characteristic determination information 151.

Figure 10:
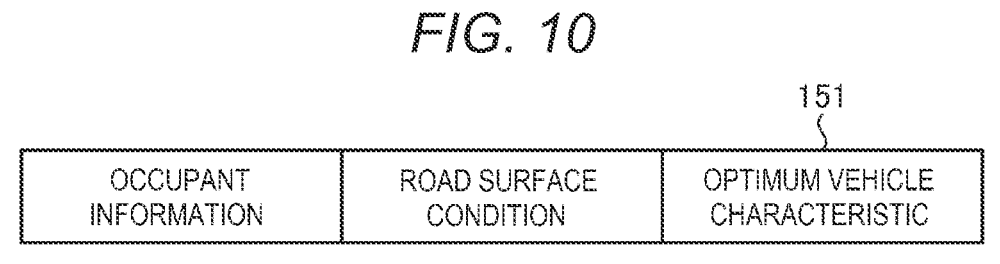

FIG. 10 is a diagram illustrating an example of a data structure of the vehicle characteristic determination information 151 according to the first embodiment. In the vehicle characteristic determination information 151, occupant information, a road surface condition, and an optimum vehicle characteristic are associated with one another, as illustrated in FIG. 10. In the present embodiment, an optimum vehicle characteristic in a range in which a probability distribution of changes in a road surface condition does not overlap a probability distribution of changes in a vehicle characteristic is obtained for each change in the occupant information before vehicle shipment, and a rule in which the occupant information, the road surface condition, and the optimum vehicle characteristic are associated with one another is stored in the storage unit 150 as the vehicle characteristic determination information 151.

The analysis unit 142 obtains an optimum vehicle characteristic based on the road surface condition acquired by the acquisition unit 141 and the occupant information acquired by the driver information acquisition unit 148 so that a probability density distribution of the changes in the road surface condition does not overlap a probability density distribution of the changes in the vehicle characteristic.

In the present embodiment, the analysis unit 142 refers to the vehicle characteristic determination information 151 and acquires the optimum vehicle characteristic based on the road surface condition and the occupant information.

Specifically, a vehicle characteristic includes a spring constant $K_s$ of the sprung portion of the suspension system 30 that determines overall power of a sprung acceleration of the suspension system 30 of the vehicle 1, the overall power serving as an index of a high-frequency vibration, and that determines a roll rate serving as an index of a roll size of the vehicle 1.

The analysis unit 142 obtains an optimum spring constant $K_s$ such that the probability density distribution of the changes in the road surface condition does not overlap a probability density distribution of the overall power of the sprung acceleration, and the probability density distribution of the changes in the road surface condition does not overlap a probability density distribution of the roll rate.

In the present embodiment, the optimum spring constant $K_s$ is registered for each piece of occupant information in the vehicle characteristic determination information 151, such that the probability density distribution of the changes in the road surface condition does not overlap the probability density distribution of the overall power of the sprung acceleration and the probability density distribution of the changes in the road surface condition does not overlap the probability density distribution of the roll rate. Therefore, the analysis unit 142 refers to the vehicle characteristic determination information 151 to obtain the optimum spring constant $K_s$.

Hereinafter, details will be described.

Figure 11:
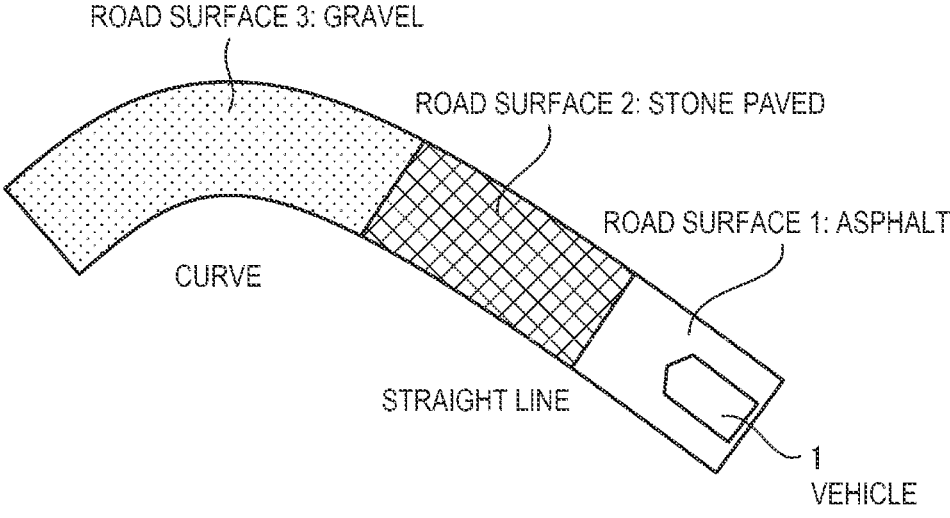
FIG. 11 is a diagram illustrating an example of a road surface condition in the first embodiment.

FIG. 11 is a diagram illustrating an example of a road surface condition for describing the analysis unit 142 according to the first embodiment. In the example illustrated in FIG. 11, a road on which the vehicle 1 travels is a straight line at the beginning and then curves. In the example illustrated in FIG. 11, a road surface 1 in a linear portion is asphalt, and unevenness of the road surface is small. A road surface 2 in the linear portion is paved with stones, and unevenness of the road surface is large. A road surface 3 in a curved portion is gravel, and unevenness of the road surface is medium.

Figure 12A:
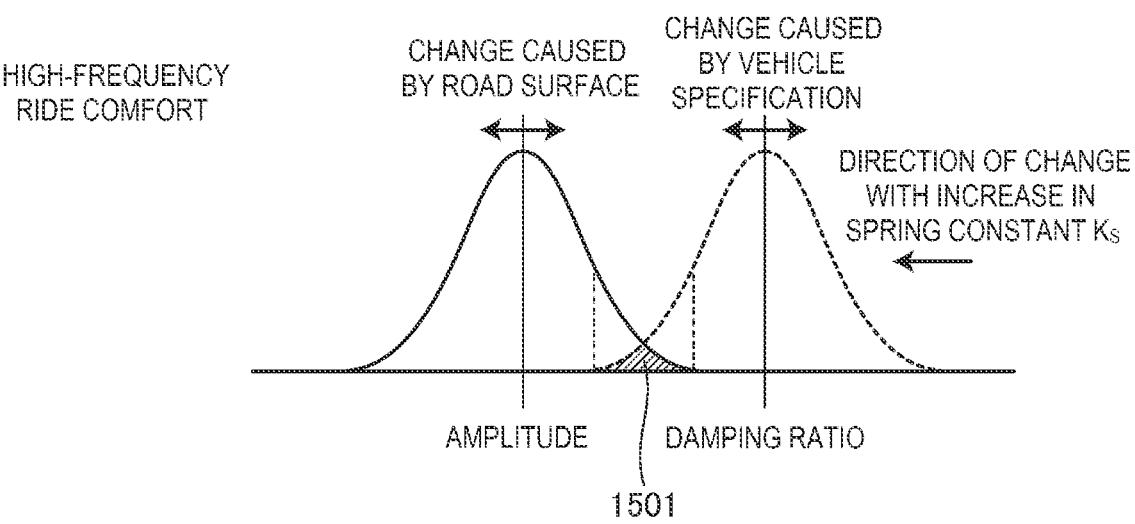
FIGS. 12A and 12B are diagrams illustrating an example of probability density distributions of changes caused by a road surface and changes caused by a vehicle characteristic related to high-frequency ride comfort control and roll size control in the first embodiment.
Figure 12B:
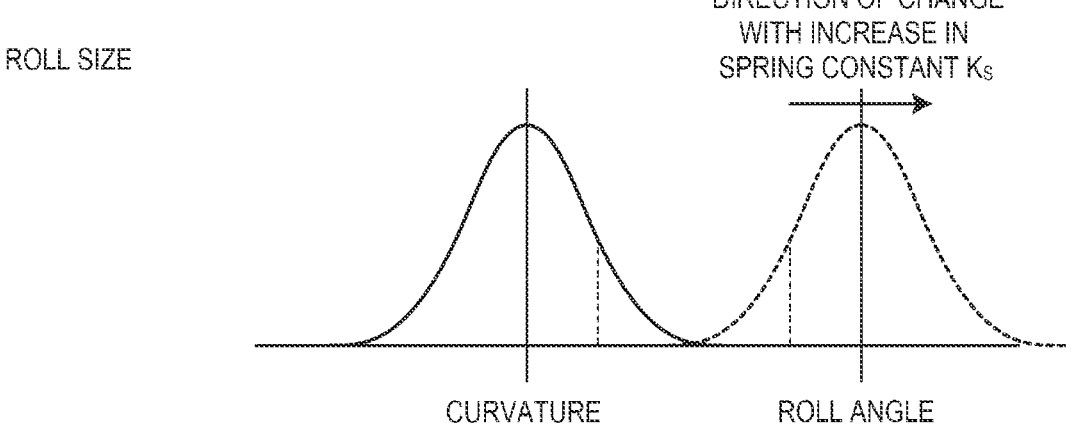

FIGS. 12A and 12B are diagrams illustrating an example of probability density distributions of changes caused by a road surface and changes caused by a vehicle characteristic related to high-frequency ride comfort control and roll size control in the first embodiment. FIG. 12A illustrates an example of the probability density distributions of the changes caused by a road surface and the changes caused by a vehicle characteristic in the high-frequency ride comfort control. FIG. 12B illustrates an example of the probability density distributions of the changes caused by a road surface and the changes caused by a vehicle characteristic in the roll size control. In FIGS. 12A and 12B, a vertical axis represents a probability density, and a horizontal axis represents a vehicle characteristic (a vehicle specification) for estimating comfort. Specifically, in FIG. 12A, the horizontal axis of the probability density distribution of the changes caused by a road surface represents an amplitude, and the amplitude increases towards a right direction. The horizontal axis of the probability density distribution of the changes caused by a vehicle characteristic (a vehicle specification) is a damping ratio, and the damping ratio decreases towards the right direction.

As illustrated in FIG. 12A, the probability density distribution according to the changes caused by a road surface moves to the left and right in FIG. 12A. The probability density distribution according to the changes caused by a vehicle characteristic (a vehicle specification) moves to the left and right in FIG. 12A. The two probability density distributions may overlap each other.

When the two probability density distributions overlap each other, an overlapping region 1501 is a failure probability in the above-described reliability engineering, and corresponds to discomfort when applied to ride comfort. In other words, when the overlapping region is negative, the overlapping region indicates a comfort state, and when the overlapping region is positive, the overlapping region indicates a discomfort state. An area of the overlapping portion indicates a discomfort probability. That is, the larger the overlapping area, the greater the discomfort probability.

As illustrated in FIG. 12A, in the high-frequency ride comfort, when the spring constant $K_s$ of the vehicle characteristic increases, the probability density distribution of the changes caused by the vehicle characteristic moves in a left direction in FIG. 12A. That is, the probability density distribution of the changes caused by the vehicle characteristic moves in a direction of overlapping the probability density distribution of the changes caused by the road surface.

In FIG. 12B, the horizontal axis of the probability density distribution of the changes caused by a road surface represents a curvature, and the curvature decreases towards a right direction. The horizontal axis of the probability density distribution of the changes caused by a vehicle characteristic (a vehicle specification) represents a roll rate, and the roll rate decreases towards the right direction. Here, the roll rate is a roll angle at lateral 0.5G.

As illustrated in FIG. 12B, when the spring constant $K_s$ of the vehicle characteristic increases, the probability density distribution of the changes caused by the vehicle characteristic moves in the right direction in FIG. 12B. That is, the probability density distribution of the changes caused by the vehicle characteristic moves in a direction away from the probability density distribution of the changes caused by the road surface.

As described above, when the spring constant $K_s$ increases, the probability density distribution of the changes caused by a road surface and the probability density distribution of the changes caused by a vehicle characteristic overlap each other in the high-frequency ride comfort control, and the probability density distribution of the changes caused by a road surface and the probability density distribution of the changes caused by a vehicle characteristic are separated from each other in the roll size control. Spring constants in the high-frequency ride comfort control and the roll size control conflict with each other.

Therefore, an optimum vehicle characteristic, that is, an optimum spring constant $K_s$, at which the overlapping region 1501 described above does not occur between the probability density distribution of the changes caused by a road surface and the probability density distribution of the changes caused by a vehicle characteristic in both the high-frequency ride comfort control and the roll size control, is determined in advance according to the road surface condition and the occupant information, and is stored in the storage unit 150 as the vehicle characteristic determination information 151 in the present embodiment. During traveling of the vehicle 1, the analysis unit 142 determines the optimum spring constant $K_s$ corresponding to the road surface condition acquired by the acquisition unit 141 and the occupant information acquired by the driver information acquisition unit 148.

More details will be described.

FIG. 13(A-1) to 13(C-2) are diagrams illustrating an example of probability density distributions of changes caused by a road surface and changes caused by a vehicle characteristic for each road surface in the first embodiment.

FIG. 13(A-1) illustrates probability density distributions of changes caused by a road surface and changes caused by a vehicle characteristic in high-frequency ride comfort control on the road surface 1 (asphalt), and FIG. 13(A-2) illustrates probability density distributions of changes caused by a road surface and changes caused by a vehicle characteristic in roll size control on the road surface 1 (asphalt). FIG. 13(B-1) illustrates probability density distributions of changes caused by a road surface and changes caused by a vehicle characteristic in high-frequency ride comfort control on the road surface 2 (stone paved), and FIG. 13(B-2) illustrates probability density distributions of changes caused by a road surface and changes caused by a vehicle characteristic in roll size control on the road surface 2 (stone paved). FIG. 13(C-1) illustrates probability density distributions of changes caused by a road surface and changes caused by a vehicle characteristic in high-frequency ride comfort control on the road surface 3 (gravel), and FIG. 13(C-2) illustrates probability density distributions of changes caused by a road surface and changes caused by a vehicle characteristic in roll size control on the road surface 3 (gravel).

Similar to FIGS. 12A and 12B, a vertical axis represents a probability density, and a horizontal axis represents a vehicle characteristic (a vehicle specification) for estimating comfort in these drawings. Specifically, in FIGS. 13(A-1), 13(B-1), and 13(C-1), the horizontal axis of the probability density distribution of the changes caused by a road surface represents an amplitude, and the amplitude increases toward a right direction. In FIGS. 13(A-1), 13(B-1), and 13(C-1), the horizontal axis of the probability density distribution of the changes caused by a vehicle characteristic (a vehicle specification) represents a damping ratio, and the damping ratio decreases toward the right direction.

In FIGS. 13(A-2), 13(B-2), and 13(C-2), the horizontal axis of the probability density distribution of the changes caused by a road surface represents a curvature, and the curvature decreases toward the right direction. In FIGS. 13(A-2), 13(B-2), and 13(C-2), the horizontal axis of the probability density distribution of the changes caused by a vehicle characteristic (a vehicle specification) represents a roll rate, and the roll rate decreases toward the right direction.

When the vehicle 1 travels on the road surface 1 that is asphalt and has small unevenness, it is assumed that the probability density distribution of the changes caused by a road surface does not overlap the probability density distribution of the changes caused by a vehicle characteristic as illustrated in FIGS. 13(A-1) and 13(A-2). That is, FIGS. 13(A-1) and 13(A-2) indicates a comfort state. Here, as illustrated in FIGS. 12A and 12B, the probability density distribution of the changes caused by a vehicle characteristic moves in a direction approaching the probability density distribution of the changes caused by a road surface due to an increase in the spring constant $K_s$ in the high-frequency ride comfort control. As illustrated in FIGS. 13(A-1) to 13(C-2), the probability density distribution of the changes caused by a vehicle characteristic moves in a direction away from the probability density distribution of the changes caused by a road surface due to an increase in the spring constant $K_s$ in the roll size control.

When the vehicle 1 travels on the road surface 2 having large unevenness due to stone pavement, the probability density distribution of changes due to a road surface in the high-frequency ride comfort moves in the right direction in which the amplitude increases, as illustrated in FIG. 13(B-1). Due to this movement, the probability density distribution of the changes caused by a road surface moves in the right direction, and overlaps the probability density distribution of the changes caused by a vehicle characteristic, as illustrated in FIG. 13(B-1).

Therefore, the analysis unit 142 decreases the spring constant $K_s$ before the two probability density distributions overlap each other, and controls the probability density distribution of the changes caused by a vehicle characteristic to move in the right direction, that is, to keep the probability density distribution of the changes caused by a vehicle characteristic away from the probability density distribution of the changes caused by a road surface. Since the spring constant $K_s$ decreases, the probability density distribution of the changes caused by a vehicle characteristic in the roll size moves in the left direction, that is, in a direction approaching the probability density distribution of the changes caused by a road surface, as illustrated in FIG. 13(B-2).

When the vehicle 1 further travels and travels on the curved road surface 3 having medium unevenness due to gravel, the probability density distribution of the changes caused by a road surface in the roll size moves in the right direction in which the curvature decreases, as illustrated in FIG. 13(C-2). Due to this movement, the probability density distribution of the changes caused by a road surface moves in the right direction, and overlaps the probability density distribution of the changes caused by a vehicle characteristic, which leads to a discomfort state, as illustrated in FIG. 13(C-2).

Therefore, the analysis unit 142 increases the spring constant $K_s$ before the two probability density distributions overlap each other, and controls the probability density distribution of the changes caused by a vehicle characteristic to move in the right direction, that is, to keep the probability density distribution of the changes caused by a vehicle characteristic away from the probability density distribution of the changes caused by a road surface. Since the spring constant increases, the probability density distribution of the changes caused by the vehicle characteristics in the high-frequency ride comfort moves in the left direction, that is, in a direction approaching the probability density distribution of the changes caused by a road surface, as illustrated in FIG. 13(C-1).

The vehicle characteristic includes a damping coefficient $C_s$ of a shock absorber of the suspension system 30 that is an index of a high-frequency vibration and a low-frequency vibration and determines a sprung transmission ratio indicating a ratio of a sprung displacement of the suspension system 30 of the vehicle 1 to a road surface displacement.

The analysis unit 142 obtains an optimum damping coefficient $C_s$ such that the probability density distribution of the changes in a road surface condition does not overlap the probability density distribution of the sprung transmission ratio in a high-frequency vibration and the probability density distribution of the changes in the road surface condition does not overlap the probability density distribution of the sprung transmission ratio in a low-frequency vibration.

In the present embodiment, the optimum damping coefficient $C_s$ is registered for each piece of occupant information in the vehicle characteristic determination information 151 such that the probability density distribution of the changes in the road surface condition does not overlap the probability density distribution of the sprung transmission ratio in the high-frequency vibration, and the probability density distribution of the changes in the road surface condition does not overlap the probability density distribution of the sprung transmission ratio in the low-frequency vibration. Therefore, the analysis unit 142 obtains the optimum damping coefficient $C_s$ with reference to the vehicle characteristic determination information 151.

Hereinafter, details will be described.

Figure 14A:
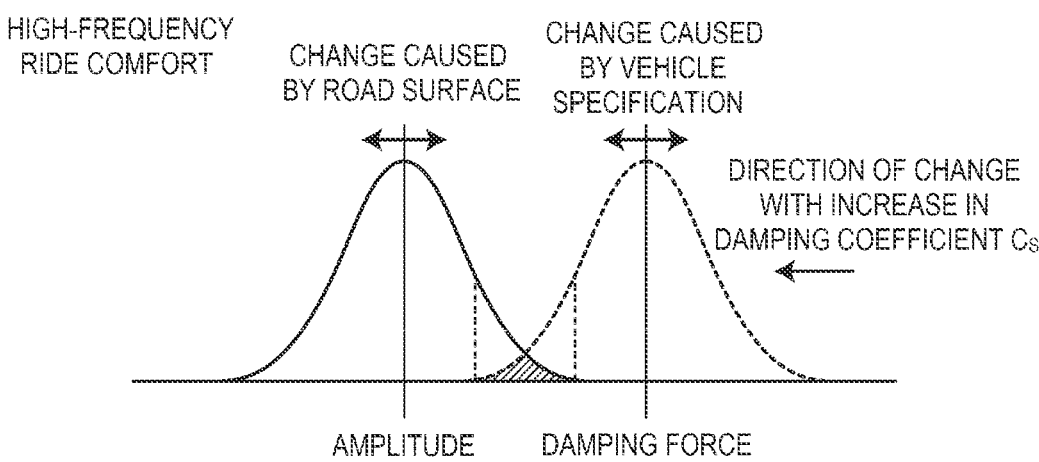
FIGS. 14A and 14B are diagrams illustrating an example of probability density distributions of changes caused by a road surface and changes caused by a vehicle characteristic related to high-frequency ride comfort control and low-frequency ride comfort control in the first embodiment.
Figure 14B:
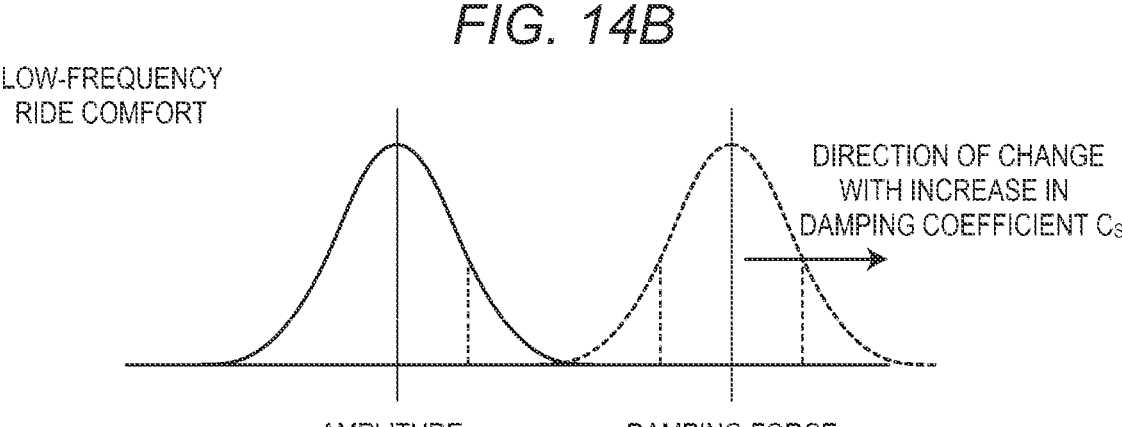

FIGS. 14A and 14B are diagrams illustrating an example of probability density distributions of changes caused by a road surface and changes caused by a vehicle characteristic related to high-frequency ride comfort control and low-frequency ride comfort control in the first embodiment. FIG. 14A illustrates an example of probability density distributions of changes caused by a road surface and changes caused by a vehicle characteristic in the high-frequency ride comfort control. FIG. 14B illustrates an example of probability density distributions of changes caused by a road surface and changes caused by a vehicle characteristic in the low-frequency ride comfort control. In FIGS. 14A and 14B, a vertical axis represents a probability density, and a horizontal axis represents a vehicle characteristic (a vehicle specification) for estimating comfort. Specifically, in FIG. 14A, the horizontal axis of the probability density distribution of the changes caused by a road surface represents an amplitude, and the amplitude increases towards a right direction. The horizontal axis of the probability density distribution of the changes caused by a vehicle characteristic (a vehicle specification) is a damping force, and the damping force decreases towards the right direction.

As illustrated in FIG. 14A, the probability density distribution according to the changes caused by a road surface moves to the left and right in FIG. 14A. The probability density distribution according to the changes caused by a vehicle characteristic (a vehicle specification) moves to the left and right in FIG. 14A. The two probability density distributions may overlap each other.

When the two probability density distributions overlap each other, an overlapping region is a failure probability as in FIG. 12, and corresponds to discomfort when applied to ride comfort. In other words, when the overlapping region is negative, the overlapping region indicates a comfort state, and when the overlapping region is positive, the overlapping region indicates a discomfort state. The larger the overlapping area, the greater the discomfort probability.

As illustrated in FIG. 14A, in the high-frequency ride comfort, when the damping coefficient $C_s$ of the vehicle characteristic increases, the probability density distribution of the changes caused by the vehicle characteristic moves in a left direction in FIG. 14A. That is, the probability density distribution of the changes caused by the vehicle characteristic moves in a direction of overlapping the probability density distribution of the changes caused by the road surface.

In FIG. 14B, the horizontal axis of the probability density distribution of the changes caused by a road surface represents an amplitude, and the amplitude increases towards a right direction. The horizontal axis of the probability density distribution of the changes caused by a vehicle characteristic (a vehicle specification) is a damping force, and the damping force increases towards the right direction.

As illustrated in FIG. 14B, when the damping coefficient $C_s$ of the vehicle characteristic increases, the probability density distribution of the changes caused by the vehicle characteristic moves in the right direction in FIG. 14B. That is, the probability density distribution of the changes caused by the vehicle characteristic moves in a direction away from the probability density distribution of the changes caused by the road surface.

As described above, when the damping coefficient $C_s$ increases, the probability density distribution of the changes caused by a road surface and the probability density distribution of the changes caused by a vehicle characteristic overlap each other in the high-frequency ride comfort control, and the probability density distribution of the changes caused by a road surface and the probability density distribution of the changes caused by a vehicle characteristic are separated from each other in the low-frequency ride comfort control. Damping coefficients $C_s$ in the high-frequency ride comfort control and the low-frequency ride comfort control conflict with each other.

Therefore, an optimum vehicle characteristic, that is, an optimum damping coefficient $C_s$, at which the overlapping region described above does not occur between the probability density distribution of the changes caused by a road surface and the probability density distribution of the changes caused by a vehicle characteristic in both the high-frequency ride comfort control and the low-frequency ride comfort control, is determined in advance according to the road surface condition and the occupant information, and is stored in the storage unit 150 as the vehicle characteristic determination information 151 in the present embodiment. During traveling of the vehicle 1, the analysis unit 142 determines the optimum damping coefficient $C_s$ corresponding to the road surface condition acquired by the acquisition unit 141 and the occupant information acquired by the driver information acquisition unit 148.

Returning to FIG. 9, the control unit 140 controls the vehicle 1 using the optimum vehicle characteristic obtained by the analysis unit 142.

Specifically, the damping force control unit 144 of the control unit 140 executes damping force control of the suspension system 30 using the optimum spring constant $K_s$ or the optimum damping coefficient $C_s$ determined by the analysis unit 142.

The spring constant switching control unit 145 of the control unit 140 executes spring constant switching control of the suspension system 30 using the optimum spring constant $K_s$ determined by the analysis unit 142.

The steering control unit 146 of the control unit 140 executes steering control of the steering system 13. The stabilizer control unit 147 of the control unit 140 executes stabilizer control of the vehicle 1.

Next, vehicle control processing executed by the vehicle control system 100 according to the present embodiment having the above-described configuration will be described.

FIG. 15 is a flowchart illustrating an example of a procedure of vehicle control processing executed by the vehicle control system 100 according to the first embodiment.

First, the acquisition unit 141 acquires an image of a road surface in front of the vehicle 1 in a traveling direction captured by the imaging unit 15c (S11). The acquisition unit 141 analyzes the acquired captured image and determines a road surface condition (that is, an undulation state of the road surface) (S13).

Next, the driver information acquisition unit 148 analyzes an image captured by the driver monitor camera 201 and acquires occupant information (S15). The acquisition unit 141 acquires a current vehicle characteristic based on detection information from various in-vehicle sensors (S17).

Next, the analysis unit 142 refers to the vehicle characteristic determination information 151 in the storage unit 150 and determines a corresponding optimum vehicle characteristic based on the occupant information and the road surface condition (S19). Then, the control unit 140 controls the vehicle 1 using the optimum vehicle characteristic determined by the analysis unit 142 (S21). That is, for example, when the vehicle characteristic is a spring constant $K_s$ of a sprung portion of a suspension, the spring constant switching control unit 145 switches the spring constant $K_s$ of the sprung portion of the suspension system 30 to the optimum spring constant $K_s$. When the vehicle characteristic is a damping coefficient $C_s$ of a shock absorber of the suspension system 30, the damping force control unit 144 sets the damping coefficient $C_s$ of the shock absorber of the suspension system 30 to the optimum damping coefficient $C_s$ and executes damping force control.

As described above, the vehicle control system 100 acquires a road surface condition in a traveling direction of the vehicle 1 and occupant information related to an occupant of the vehicle, obtains an optimum vehicle characteristic based on the road surface condition and the occupant information so that a probability density distribution of changes in the road surface condition does not overlap a probability density distribution of changes in the vehicle characteristic in reliability engineering, and controls the vehicle using the obtained optimum vehicle characteristic in the present embodiment.

Therefore, according to the present embodiment, an optimum vehicle characteristic can be determined according to a change in a state of the occupant, a change in the road surface condition, and a change in the vehicle characteristic even in control in which values of vehicle characteristics conflict with each other. Accordingly, according to the present embodiment, optimum vehicle control can be achieved. In particular, since the optimum vehicle characteristic is obtained in consideration of a deterioration curve in reliability engineering based on the occupant information, a discomfort feeling depending on age of an occupant or the like can be adopted in determination, the optimum vehicle characteristic can be more accurately determined, and optimum vehicle control can be achieved in the present embodiment.

In the present embodiment, the vehicle control system 100 stores, in the storage unit 150, the vehicle characteristic determination information 151 in which the occupant information is associated in advance with the optimum vehicle characteristic in a range in which a probability distribution of changes in a road surface condition does not overlap a probability distribution of changes in a vehicle characteristic, and obtains an optimum vehicle characteristic based on the road surface condition and the occupant information in the vehicle characteristic determination information 151.

Therefore, according to the present embodiment, based on the vehicle characteristic determination information 151 in which the occupant information is associated in advance with the optimum vehicle characteristic in a range in which the probability distribution of changes in the road surface condition does not overlap the probability distribution of changes in the vehicle characteristic, the optimum vehicle characteristic can be determined according to a change in a state of an occupant, a change in the road surface condition, and a change in the vehicle characteristic even in control in which values of the vehicle characteristic conflict with each other. Accordingly, according to the present embodiment, optimum vehicle control can be achieved.

In the present embodiment, the vehicle characteristic includes a spring constant of a sprung portion of the suspension system 30 that determines overall power of a sprung acceleration of the suspension system 30 of the vehicle 1, the overall power serving as an index of a high-frequency vibration, and that determines a roll rate serving as an index of a roll size of the vehicle 1, an optimum spring constant is obtained such that a probability density distribution of changes in a road surface condition does not overlap a probability density distribution of the overall power of the sprung acceleration and the probability density distribution of changes in the road surface condition does not overlap a probability density distribution of the roll rate, and damping force control of a suspension is performed based on the optimum spring constant, in the vehicle control system 100.

Therefore, according to the present embodiment, an optimum spring constant can be determined according to a change in a state of an occupant, a change in the road surface condition, and a change in the vehicle characteristic even in control in which values of the spring constant conflict with each other, and accordingly optimum damping force control can be achieved.

In the present embodiment, the vehicle characteristic includes a damping coefficient of a shock absorber of the suspension system 30 for determining a sprung transmission ratio that is an index of a high-frequency vibration and a low-frequency vibration and that indicates a ratio of a sprung displacement of the suspension system 30 of the vehicle 1 to a road surface displacement, an optimum damping coefficient is obtained such that a probability density distribution of changes in the road surface condition does not overlap a probability density distribution of the sprung transmission ratio in the high-frequency vibration and the probability density distribution of the changes in the road surface condition does not overlap a probability density distribution of the sprung transmission ratio in the low-frequency vibration, and damping force control of the suspension system 30 is performed based on the optimum damping coefficient, in the vehicle control system 100.

Therefore, according to the present embodiment, an optimum damping coefficient can be determined according to a change in a state of an occupant, a change in the road surface condition, and a change in the vehicle characteristic even in control in which values of the damping coefficient conflict with each other, and accordingly optimum damping force control can be achieved.

Second Embodiment

In the first embodiment, before shipment of the vehicle, an optimum vehicle characteristic at which a probability density distribution of changes in a road surface condition does not overlap a probability density distribution of changes in a vehicle characteristic is determined in advance as the vehicle characteristic determination information 151 in association with the road surface condition and occupant information. During traveling of the vehicle 1, the analysis unit 142 refers to the vehicle characteristic determination information 151 and determines the optimum vehicle characteristic according to a current road surface condition and occupant information. In the second embodiment, during traveling of the vehicle 1, a vehicle characteristic at which a probability density distribution of changes in a road surface condition does not overlap a probability density distribution of changes in a vehicle characteristic is obtained based on a current road surface condition and occupant information, it is determined whether the vehicle characteristic is optimum, and the optimum vehicle characteristic is determined and learned.

Configurations of the vehicle 1 and a vehicle control system 1100 according to the second embodiment are similar to those in the first embodiment.

In the vehicle control system 1100 according to the second embodiment, functions executed by the ECU 14 are different from those in the first embodiment.

Figure 16:
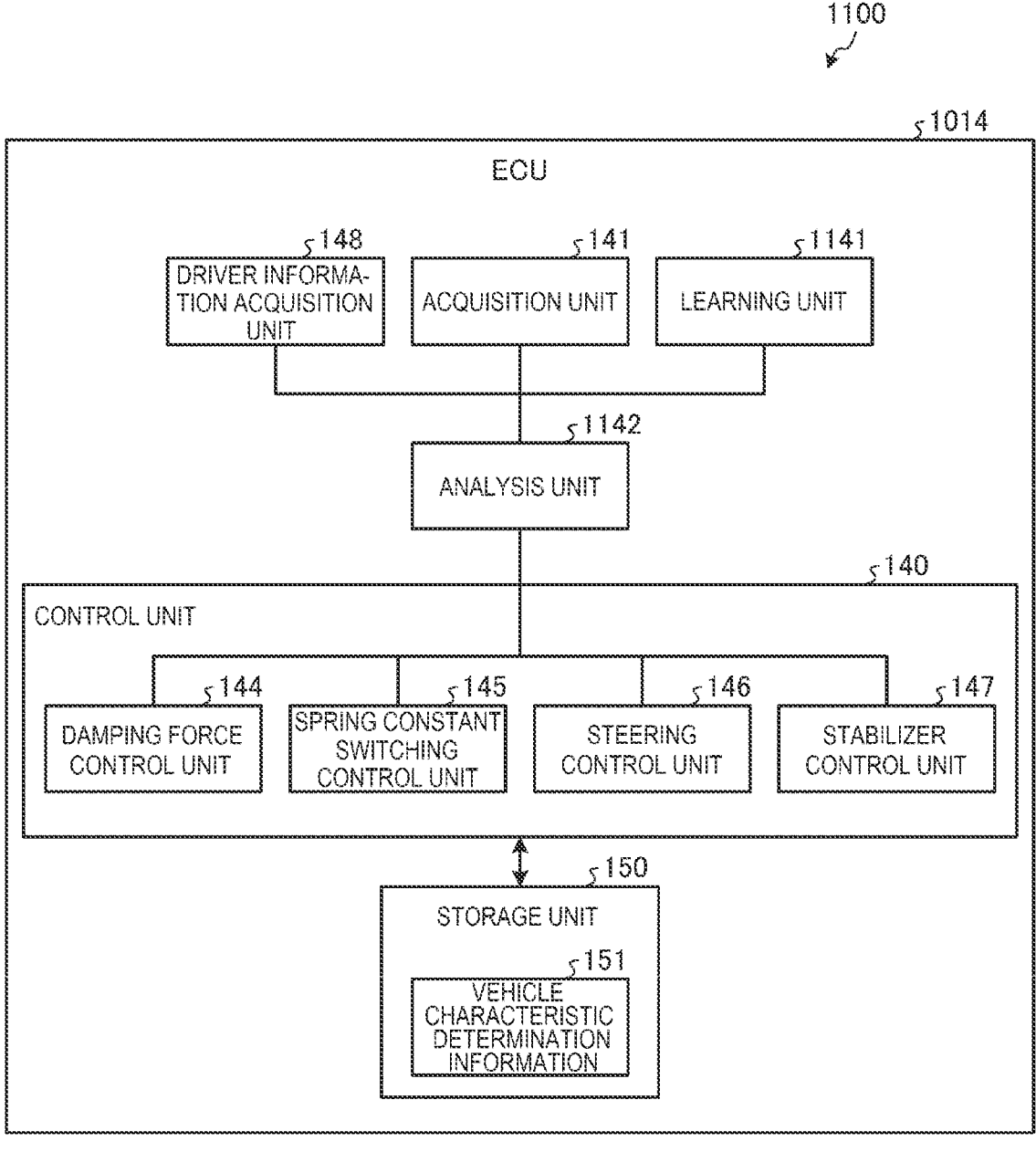
FIG. 16 is a diagram illustrating an example of a functional configuration of an ECU provided in a vehicle according to a second embodiment.

Next, an example of a functional configuration of the ECU 14 provided in the vehicle 1 according to the present embodiment will be described with reference to FIG. 16. FIG. 16 is a diagram illustrating an example of a functional configuration of the ECU 14 provided in the vehicle according to the second embodiment.

As illustrated in FIG. 16, the ECU 14 according to the present embodiment functions as a vehicle control device including at least the driver information acquisition unit 148, the acquisition unit 141, an analysis unit 1142, a learning unit 1141, the control unit 140, and the storage unit 150. The driver information acquisition unit 148, the acquisition unit 141, the control unit 140, and the storage unit 150 are the same as those in the first embodiment.

The analysis unit 1142 obtains a probability density distribution of changes in a road surface condition and a probability density distribution of changes in a vehicle characteristic based on a road surface condition and a current vehicle characteristic acquired by the acquisition unit 141 and occupant information acquired by the driver information acquisition unit 148 during traveling of the vehicle, and calculates an area of an overlapping region of the two probability density distributions. The analysis unit 1142 repeatedly executes calculation processing while changing values of the vehicle characteristic.

More specifically, similar to the first embodiment, the vehicle characteristic includes the spring constant $K_s$ of the sprung portion of the suspension system 30 and the damping coefficient $C_s$ of the shock absorber of the suspension system 30.

The analysis unit 1142 repeatedly calculates an overlapping region between the probability density distribution of the changes in the road surface condition and the probability density distribution of overall power of a sprung acceleration while changing values of the spring constant $K_s$ during traveling of the vehicle 1.

The analysis unit 1142 repeatedly calculates an area of an overlapping region between the probability density distribution of the changes in the road surface condition and a probability density distribution of a sprung transmission ratio in a high-frequency vibration while changing values of the damping coefficient $C_s$.

The analysis unit 1142 may be configured to calculate the area of the overlapping region by obtaining any one probability density distribution based on any one vehicle characteristic without using the current vehicle characteristic, and repeatedly execute the calculation by changing values of the vehicle characteristic.

The learning unit 1141 executes learning processing of determining, as an optimum vehicle characteristic, a vehicle characteristic that is obtained by the analysis unit 1142 and at which the overlapping region is not present. For example, reinforcement learning is used as the learning processing. Specifically, the learning unit 1141 calculates the area of the overlapping region calculated by the analysis unit 1142. Then, the learning unit 1141 obtains a reward that is an output value of a reward function by inputting the obtained area of the overlapping portion to the reward function that has a larger value as the area of the overlapping portion is smaller. Then, the analysis unit 1142 repeatedly executes the calculation. The learning unit 1141 executes learning processing of obtaining a reward by inputting an output area to a reward function each time the calculation is executed and determining a value of a vehicle characteristic at which the reward is maximum as an optimum vehicle characteristic.

Although reinforcement learning is adopted as the learning processing in the present embodiment, the embodiment disclosed here is not limited thereto, and another learning algorithm may be adopted for the learning unit 1141.

Next, vehicle control processing executed by the vehicle control system 1100 according to the present embodiment configured as described above will be described.

Figure 17:
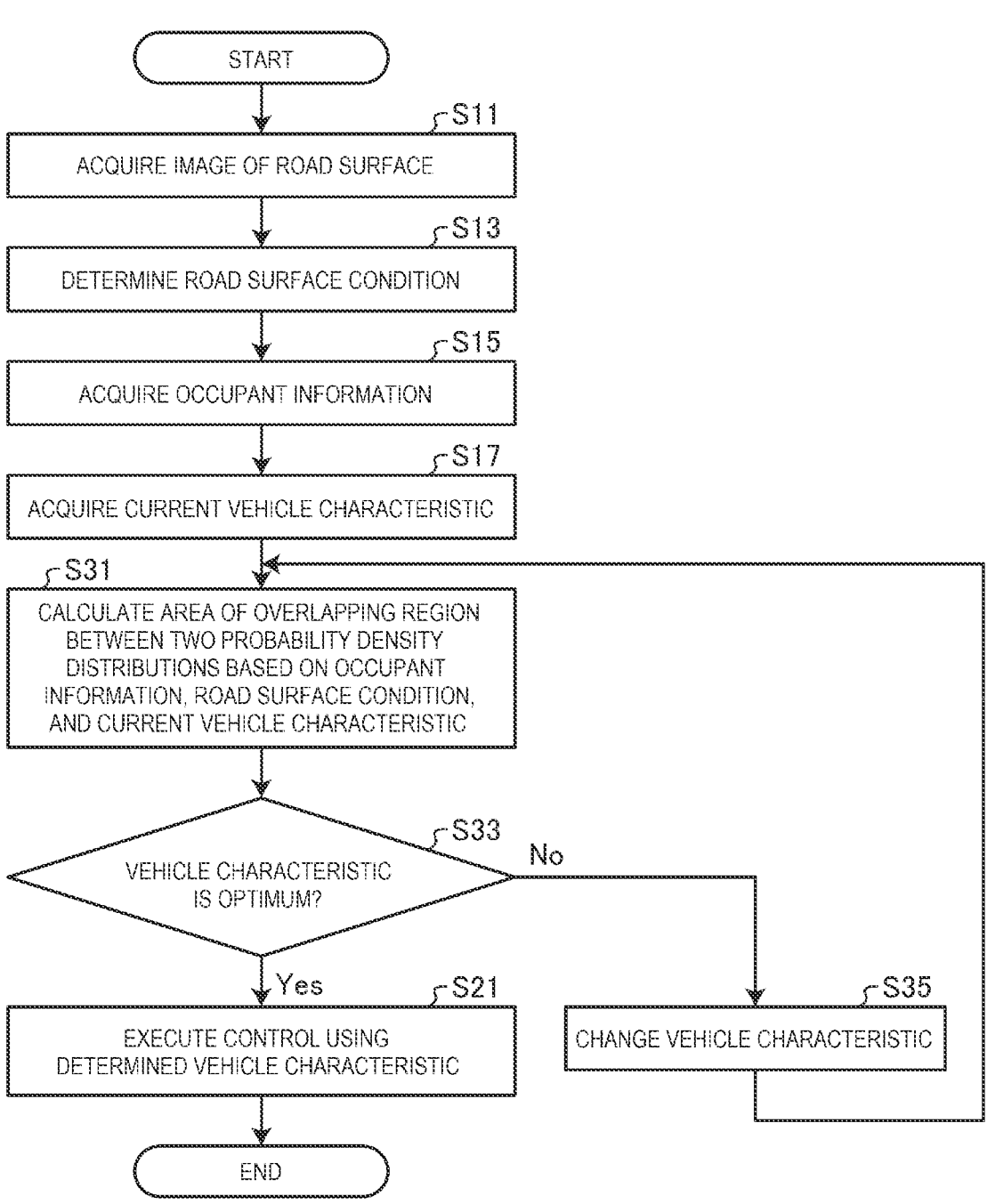
FIG. 17 is a flowchart illustrating an example of a procedure of vehicle control processing executed by a vehicle control system according to the second embodiment.

FIG. 17 is a flowchart illustrating an example of a procedure of vehicle control processing executed by the vehicle control system 1100 according to the second embodiment.

Processing from the acquisition of an image of a road surface to the acquisition of a current vehicle characteristic (S11 to S17) is executed in a similar manner to that in the first embodiment.

When the current vehicle characteristic is acquired, the analysis unit 1142 obtains a probability density distribution of changes caused by a road surface and a probability density distribution of changes caused by a vehicle characteristic based on the acquired occupant information, the current road surface condition, and the current vehicle characteristic, and obtains an area of an overlapping region between the two probability density distributions (S31).

Next, the learning unit 1141 determines whether a vehicle characteristic at this time point is optimum (S33). Specifically, the learning unit 1141 determines whether the area of the overlapping region obtained in S31 is minimum according to the above-described reward function.

In S33, when the vehicle characteristic is not optimum (S33: No), the analysis unit 1142 changes a value of the vehicle characteristic (S35), and returns the processing to S31. Accordingly, the processing in S31 is repeatedly executed while changing the vehicle characteristic.

In S33, when the two probability density distributions do not overlap and the vehicle characteristic is optimum (S33: Yes), the control unit 140 executes control of the vehicle 1 using the optimum vehicle characteristic (S21).

As described above, the vehicle control system 1100 according to the present embodiment executes the learning processing of obtaining the overlapping region between the probability density distribution of the changes in the road surface condition and the probability density distribution of the changes in the vehicle characteristic based on the road surface condition and the occupant information while changing the vehicle characteristic during traveling of the vehicle 1, and determining, as an optimum vehicle characteristic, a vehicle characteristic at which the overlapping region is not present.

Therefore, according to the present embodiment, an optimum vehicle characteristic can be dynamically determined according to a change in a state of an occupant, a change in a road surface condition, and a change in a vehicle characteristic even in control in which values of the vehicle characteristic conflict with each other during traveling of the vehicle, and accordingly more optimum vehicle control can be achieved.

Modifications

Various modifications can be applied to the embodiments described above.

For example, although the conflict A between the high-frequency ride comfort and the roll size and the conflict B between the high-frequency ride comfort and the low-frequency ride comfort are described in the embodiments described above, the same method may be applied to other conflicts, that is, the conflict C between the high-frequency ride comfort and the ground contact property and the conflict D between the steering effectiveness and the Rr firm feeling.

Although an undulation state of a road surface (that is, an unevenness state) is described as an example of an input road surface condition in the embodiments described above, the road surface condition is not limited thereto. For example, a friction coefficient of a road surface (that is, smoothness of the road surface), gradient of a road surface, and cant (that is, a height difference between the inside and the outside of a curved portion of a road surface) may be used as the road surface condition. Further, the analysis units 142 and 1142 may be configured to determine an optimum vehicle characteristic by inputting an accident occurrence condition, a weather condition, an influence of other vehicles, and the like.

Although a spring constant and a damping coefficient are used as a vehicle characteristic in the embodiments described above, the vehicle characteristic is not limited thereto. For example, the analysis unit may be configured to set a vehicle speed, a load, ground weighted, a height of a center of gravity, a type of a tire, a damping ratio, rigidity, and the like as the vehicle characteristic. Further, the analysis units 142 and 1142 can be configured to set the number of occupants, delicacy of a load, and attribute and delicacy of physique and so on of an occupant as an attribute and physique of an occupant as the vehicle characteristic.

In the embodiments and the modifications described above, occupant information is used as a factor that affects comfort and discomfort which are indicated by a deterioration curve, however, the invention is not limited thereto. For example, the analysis units 142 and 1142 may be configured to consider, as the deterioration curve, a purpose of an occupant (for example, bed, hanging out, commuting, business, sightseeing, emergency transportation, and shared riding), a performance change due to aged deterioration or fatigue of the vehicle 1, fatigue of an occupant, a drunk state, a hungry state, and a psychological state.

In the embodiments and the modifications described above, the CPU 14*a* reads and executes a program stored in a storage device such as the ROM 14*b* or the SSD 14*f*, thereby implementing various functional modules such as the driver information acquisition unit 148, the acquisition unit 141, the analysis units 142 and 1142, the learning unit 1141, the damping force control unit 144, the spring constant switching control unit 145, the steering control unit 146, and the stabilizer control unit 147.

In the embodiments and the modifications described above, various functional modules such as the driver information acquisition unit 148, the acquisition unit 141, the analysis units 142 and 1142, the learning unit 1141, the damping force control unit 144, the spring constant switching control unit 145, the steering control unit 146, and the stabilizer control unit 147 are implemented by a processor such as the CPU 14*a* reading and executing a program stored in a storage device such as the ROM 14*b* or the SSD 14*f*. However, the functional modules are not limited thereto. For example, various functional modules such as the driver information acquisition unit 148, the acquisition unit 141, the analysis units 142 and 1142, the learning unit 1141, the damping force control unit 144, the spring constant switching control unit 145, the steering control unit 146, and the stabilizer control unit 147 may be implemented by independent hardware.

A vehicle control program executed by the vehicle control device and the vehicle control systems 100 and 1100 according to the embodiments and the modifications described above is provided by being incorporated in a ROM or the like in advance.

The vehicle control program executed by the vehicle control device and the vehicle control systems 100 and 1100 according to the embodiments and modifications described above may be provided by being recorded in a computer-readable recording medium such as a CD-ROM, a flexible disk (FD), a CD-R, or a digital versatile disk (DVD) in an installable or executable file format.

Furthermore, the vehicle control program executed by the vehicle control device and the vehicle control systems 100 and 1100 according to the embodiments and the modifications described above may be stored in a computer connected to a network such as the Internet and may be provided by being downloaded via the network. The vehicle control program executed by the vehicle control device and the vehicle control systems 100 and 1100 according to the embodiments and the modifications may be provided or distributed via a network such as the Internet.

The vehicle control program executed by the vehicle control device and the vehicle control systems 100 and 1100 according to the embodiments and modifications described above has a module configuration including the above-described units (that is, the driver information acquisition unit 148, the acquisition unit 141, the analysis units 142 and 1142, the learning unit 1141, the damping force control unit 144, the spring constant switching control unit 145, the steering control unit 146, the stabilizer control unit 147, and the like). As actual hardware, the above-described units are loaded onto a main storage device by the CPU reading and executing the vehicle control program from the ROM, and the driver information acquisition unit 148, the acquisition unit 141, the analysis units 142 and 1142, the learning unit 1141, the damping force control unit 144, the spring constant switching control unit 145, the steering control unit 146, the stabilizer control unit 147, and the like are formed on the main storage device.

A vehicle control device according to an embodiment includes: an acquisition unit configured to acquire a road surface condition in a traveling direction of a vehicle and occupant information on an occupant of the vehicle; an analysis unit configured to obtain an optimum vehicle characteristic based on the road surface condition and the occupant information such that a probability density distribution of changes in the road surface condition does not overlap a probability density distribution of changes in a vehicle characteristic; and a control unit configured to control the vehicle using the optimum vehicle characteristic obtained by the analysis unit.

According to this configuration, for example, the optimum vehicle characteristic can be determined according to a change in a state of an occupant, a change in a road surface condition, and a change in a vehicle characteristic even in control in which values of the vehicle characteristic conflict with each other, and accordingly optimum vehicle control can be achieved.

The vehicle control device according to the embodiment further includes a storage unit configured to store vehicle characteristic determination information in which the occupant information is associated in advance with the optimum vehicle characteristic in a range in which a probability distribution of the changes in the road surface condition does not overlap a probability distribution of the changes in the vehicle characteristic, and the analysis unit obtains the optimum vehicle characteristic based on the road surface condition and the occupant information in the vehicle characteristic determination information.

According to this configuration, for example, based on the vehicle characteristic determination information in which the occupant information is associated in advance with the optimum vehicle characteristic in a range in which the probability distribution of the changes in the road surface condition does not overlap the probability distribution of the changes in the vehicle characteristic, the optimum vehicle characteristic can be determined according to a change in a state of an occupant, a change in a road surface condition, and a change in a vehicle characteristic even in control in which values of the vehicle characteristic conflict with each other, and accordingly optimum vehicle control can be achieved.

In the vehicle control device according to the embodiment, the analysis unit obtains an overlapping region between the probability density distribution of the changes in the road surface condition and the probability density distribution of the changes in the vehicle characteristic based on the road surface condition and the occupant information while changing the vehicle characteristic during traveling of the vehicle, and the vehicle control device further includes a learning unit configured to execute learning processing of determining, as an optimum vehicle characteristic, a vehicle characteristic that is obtained by the analysis unit and at which the overlapping region is not present.

According to this configuration, an optimum vehicle characteristic can be dynamically determined according to a change in a state of an occupant, a change in a road surface condition, and a change in a vehicle characteristic even in control in which values of the vehicle characteristic conflict with each other during traveling of the vehicle, and accordingly more optimum vehicle control can be achieved.

In the vehicle control device according to the embodiment, the vehicle characteristic includes a spring constant of a sprung portion of a suspension, the spring constant being used for determining overall power of a sprung acceleration of the suspension of the vehicle, the overall power serving as an index of a high-frequency vibration, and for determining a roll rate serving as an index of a roll size of the vehicle, the analysis unit obtains an optimum spring constant such that the probability density distribution of the changes in the road surface condition does not overlap a probability density distribution of the overall power of the sprung acceleration and the probability density distribution of the changes in the road surface condition does not overlap a probability density distribution of the roll rate, and the control unit performs damping force control of the suspension based on the optimum spring constant.

According to this configuration, for example, an optimum spring constant can be determined according to a change in a state of an occupant, a change in a road surface condition, and a change in a vehicle characteristic even in control in which values of the spring constant conflict with each other, and accordingly optimum damping force control can be achieved.

In the vehicle control device according to the embodiment, the vehicle characteristic includes a damping coefficient of a shock absorber of the suspension, the damping coefficient being used for determining a sprung transmission ratio that is an index of a high-frequency vibration and a low-frequency vibration and that indicates a ratio of a sprung displacement of the suspension of the vehicle to a road surface displacement, the analysis unit obtains an optimum damping coefficient such that the probability density distribution of the changes in the road surface condition does not overlap a probability density distribution of the sprung transmission ratio in the high-frequency vibration and the probability density distribution of the changes in the road surface condition does not overlap a probability density distribution of the sprung transmission ratio in the low-frequency vibration, and the control unit performs damping force control of the suspension based on the optimum damping coefficient.

According to this configuration, for example, an optimum damping coefficient can be determined according to a change in a state of an occupant, a change in a road surface condition, and a change in a vehicle characteristic even in control in which values of the damping coefficient conflict with each other, and accordingly optimum damping force control can be achieved.

An analysis device according to an embodiment includes: an acquisition unit configured to acquire a road surface condition in a traveling direction of a vehicle and occupant information on an occupant of the vehicle; and an analysis unit configured to obtain an optimum vehicle characteristic based on the road surface condition and the occupant information such that a probability density distribution of changes in the road surface condition does not overlap a probability density distribution of changes in a vehicle characteristic.

According to this configuration, for example, an optimum vehicle characteristic can be determined according to a change in a state of an occupant, a change in a road surface condition, and a change in a vehicle characteristic even in control in which values of the vehicle characteristic conflict with each other, and accordingly optimum vehicle control can be achieved.

An analysis method according to an embodiment is executed by a vehicle control device that controls a vehicle, and the analysis method includes: acquiring a road surface condition in a traveling direction of the vehicle and occupant information on an occupant of the vehicle; and obtaining an optimum vehicle characteristic based on the road surface condition and the occupant information such that a probability density distribution of changes in the road surface condition does not overlap a probability density distribution of changes in a vehicle characteristic.

According to this configuration, for example, an optimum vehicle characteristic can be determined according to a change in a state of an occupant, a change in a road surface condition, and a change in a vehicle characteristic even in control in which values of the vehicle characteristic conflict with each other, and accordingly optimum vehicle control can be achieved.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle control device comprising:
   a storage unit configured to store a probability density distribution of changes in the road surface condition and a probability density distribution of changes in a vehicle characteristic;
   an acquisition unit configured to acquire a road surface condition in a traveling direction of a vehicle and occupant information on an occupant of the vehicle;
   an analysis unit configured to obtain a vehicle characteristic based on the road surface condition and the occupant information such that the probability density distribution of changes in the road surface condition does not overlap the probability density distribution of changes in a vehicle characteristic; and
   a control unit configured to control the vehicle using the vehicle characteristic obtained by the analysis unit.

2. The vehicle control device according to claim 1, further comprising:
   the storage unit is further configured to store vehicle characteristic determination information in which the occupant information is associated in advance with the vehicle characteristic in a range in which the probability distribution of the changes in the road surface condition does not overlap the probability distribution of the changes in the vehicle characteristic, wherein the analysis unit obtains the vehicle characteristic based on the road surface condition and the occupant information in the vehicle characteristic determination information.

3. The vehicle control device according to claim 1, wherein the analysis unit obtains an overlapping region between the probability density distribution of the changes in the road surface condition and the probability density distribution of the changes in the vehicle characteristic based on the road surface condition and the occupant information while changing the vehicle characteristic during traveling of the vehicle, and the vehicle control device further comprises a learning unit configured to execute learning processing of determining, as the vehicle characteristic, a vehicle characteristic that is obtained by the analysis unit and at which the overlapping region is not present.

4. The vehicle control device according to claim 2, wherein the storage unit is further configured to store a probability density distribution of the overall power of the sprung acceleration and a probability density distribution of the roll rate, the vehicle characteristic includes a spring constant of a sprung portion of a suspension, the spring constant being used for determining overall power of a sprung acceleration of the suspension of the vehicle, the overall power serving as an index of a high-frequency vibration, and for determining a roll rate serving as an index of a roll size of the vehicle, the analysis unit obtains a spring constant such that the probability density distribution of the changes in the road surface condition does not overlap the probability density distribution of the overall power of the sprung acceleration and the probability density distribution of the changes in the road surface condition does not overlap the probability density distribution of the roll rate, and the control unit performs damping force control of the suspension based on the spring constant.

5. The vehicle control device according to claim 2, wherein the storage unit is further configured to store a probability density distribution of the sprung transmission ratio in the high-frequency vibration and a probability density distribution of the sprung transmission ratio in the low-frequency vibration, the vehicle characteristic includes a damping coefficient of a shock absorber of a suspension, the damping coefficient being used for determining a sprung transmission ratio that is an index of a high-frequency vibration and a low-frequency vibration and that indicates a ratio of a sprung displacement of the suspension of the vehicle to a road surface displacement, the analysis unit obtains a damping coefficient such that the probability density distribution of the changes in the road surface condition does not overlap the probability density distribution of the sprung transmission ratio in the high-frequency vibration and the probability density distribution of the changes in the road surface condition does not overlap the probability density distribution of the sprung transmission ratio in the low-frequency vibration, and the control unit performs damping force control of the suspension based on the damping coefficient.

6. The vehicle control device according to claim 3, wherein the storage unit is further configured to store a probability density distribution of the overall power of the sprung acceleration and a probability density distribution of the roll rate, the vehicle characteristic includes a spring constant of a sprung portion of a suspension, the spring constant being used for determining overall power of a sprung acceleration of the suspension of the vehicle, the overall power serving as an index of a high-frequency vibration, and for determining a roll rate serving as an index of a roll size of the vehicle, the analysis unit obtains a spring constant such that the probability density distribution of the changes in the road surface condition does not overlap a probability density distribution of the overall power of the sprung acceleration and the probability density distribution of the changes in the road surface condition does not overlap a probability density distribution of the roll rate, and the control unit performs damping force control of the suspension based on the spring constant.

7. The vehicle control device according to claim 3, wherein the storage unit is further configured to store a probability density distribution of the sprung transmission ratio in the high-frequency vibration and a probability density distribution of the sprung transmission ratio in the low-frequency vibration, the vehicle characteristic includes a damping coefficient of a shock absorber of a suspension, the damping coefficient being used for determining a sprung transmission ratio that is an index of a high-frequency vibration and a low-frequency vibration and that indicates a ratio of a sprung displacement of the suspension of the vehicle to a road surface displacement, the analysis unit obtains a damping coefficient such that the probability density distribution of the changes in the road surface condition does not overlap a probability density distribution of the sprung transmission ratio in the high-frequency vibration and the probability density distribution of the changes in the road surface condition does not overlap a probability density distribution of the sprung transmission ratio in the low-frequency vibration, and the control unit performs damping force control of the suspension based on the damping coefficient.

8. An analysis device comprising:

a storage unit configured to store a probability density distribution of changes in the road surface condition and a probability density distribution of changes in a vehicle characteristic, an acquisition unit configured to acquire a road surface condition in a traveling direction of a vehicle and occupant information on an occupant of the vehicle; and an analysis unit configured to obtain an vehicle characteristic based on the road surface condition and the occupant information such that the probability density distribution of changes in the road surface condition does not overlap the probability density distribution of changes in a vehicle characteristic.

9. An analysis method executed by a vehicle control device that controls a vehicle, the analysis method comprising:

storing a probability density distribution of changes in the road surface condition and a probability density distribution of changes in a vehicle characteristic, acquiring a road surface condition in a traveling direction of the vehicle and occupant information on an occupant of the vehicle; and obtaining an optimum vehicle characteristic based on the road surface condition and the occupant information such that the probability density distribution of changes in the road surface condition does not overlap the probability density distribution of changes in a vehicle characteristic.

10. The vehicle control device according to claim 1, wherein the acquisition unit acquires the road surface condition in the traveling direction of the vehicle using an image capture device to capture an image in front of the vehicle.

11. The vehicle control device according to claim 8, wherein the acquisition unit acquires the road surface condition in the traveling direction of the vehicle using an image capture device to capture an image in front of the vehicle.

12. The analysis method according to claim 9, wherein the road surface condition in the traveling direction of the vehicle is acquired using an image capture device to capture an image in front of the vehicle.

\*   \*   \*   \*   \*